US007892620B2

(12) United States Patent (10) Patent No.: US 7,892,620 B2
Tsuchino et al. (45) Date of Patent: Feb. 22, 2011

(54) INFORMATION RECORDING MEDIUM AND METHOD FOR MANUFACTURING THEREOF

(75) Inventors: Akio Tsuchino, Osaka (JP); Takashi Nishihara, Osaka (JP); Rie Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 502 days.

(21) Appl. No.: 12/095,711

(22) PCT Filed: Nov. 1, 2006

(86) PCT No.: PCT/JP2006/321824

§ 371 (c)(1),
(2), (4) Date: May 30, 2008

(87) PCT Pub. No.: WO2007/063672

PCT Pub. Date: Jun. 7, 2007

(65) Prior Publication Data

US 2010/0285263 A1 Nov. 11, 2010

(30) Foreign Application Priority Data

Nov. 30, 2005 (JP) .............................. 2005-345656

(51) Int. Cl.
*B32B 3/02* (2006.01)
(52) U.S. Cl. ..................... 428/64.1; 428/64.4; 428/64.5; 428/64.6; 430/270.13
(58) Field of Classification Search ........................ None
See application file for complete search history.

(56) References Cited

U.S. PATENT DOCUMENTS 4,847,132 A 7/1989 Takao et al.
2002/0060978 A1* 5/2002 Hirotsune et al. ........ 369/275.3
2003/0179117 A1 9/2003 Kojima et al.
2003/0190447 A1* 10/2003 Kojima et al. .............. 428/64.1

(Continued)

FOREIGN PATENT DOCUMENTS

JP 62-222442 9/1987

(Continued)

OTHER PUBLICATIONS

International Search Report issued Jan. 30, 2007 in International (PCT) Application No. PCT/JP2006/321824.

*Primary Examiner*—Elizabeth Mulvaney
(74) *Attorney, Agent, or Firm*—Wenderoth, Lind & Ponack, L.L.P.

(57) ABSTRACT

There is provided a dielectric material containing no sulfur (S), and there is provided an information recording medium that affords high signal quality and excellent recording sensitivity and repeated rewrite characteristics, even though no interface layer is provided between a reflective layer and a dielectric layer. To this end, the present invention is an information recording medium that is equipped with at least a recording layer and undergoes phase change when the recording layer is irradiated with a laser beam or when current is applied, comprising an oxide-fluoride dielectric layer that includes indium (In), an element M1 (where M1 is at least one element selected from among Zr, Hf, Y, Ti, Nb, Ta, Cr, Ga, and Si), oxygen (O), an element M2 (where M2 is at least one element selected from among La, Ce, Pr, Nd, Gd, Tb, Dy, Ho, Er, Yb, Mg, Ca, and Sr), and fluorine (F).

19 Claims, 8 Drawing Sheets

U.S. PATENT DOCUMENTS

| | | | |
|---|---|---|---|
| 2005/0018593 A1* | 1/2005 | Doi et al. | 369/275.2 |
| 2005/0019695 A1 | 1/2005 | Kojima et al. | |
| 2005/0074694 A1 | 4/2005 | Nishihara et al. | |
| 2008/0032156 A1* | 2/2008 | Tsuchino et al. | 428/696 |

FOREIGN PATENT DOCUMENTS

| | | |
|---|---|---|
| JP | 6-90808 | 11/1994 |
| JP | 7-25209 | 3/1995 |
| JP | 8-180458 | 7/1996 |
| JP | 10-172182 | 6/1998 |
| JP | 2003-323743 | 11/2003 |
| JP | 2005-56545 | 3/2005 |
| JP | 2005-129205 | 5/2005 |

* cited by examiner

INFORMATION RECORDING MEDIUM AND METHOD FOR MANUFACTURING THEREOF

TECHNICAL FIELD

The present invention relates to an information recording medium with which information is recorded or reproduced by an optical or electrical means, and to a method for manufacturing this medium.

BACKGROUND ART

A Blu-ray Disc is an example of an optical information recording medium. An example of the layer structure of this medium is one in which a reflective layer, a third interface layer, a second dielectric layer, a second interface layer, a recording layer, a first interface layer, a first dielectric layer, and a cover layer are formed in that order on the surface of a substrate.

The function of the first dielectric layer and second dielectric layer is to adjust the optical distance (equal to the refractive index×the physical distance) and thereby raise the optical absorption efficiency of the recording layer, and increase the difference in reflectivity between the crystal phase and amorphous phase to increase signal amplitude. They also function to protect the recording layer from moisture and so forth. An example of the material of these dielectric layers is a mixture of 80 mol % ZnS and 20 mol % $SiO_2$ (hereinafter referred to as $(ZnS)_{80}(SiO_2)_{20}$) (see Japanese Patent Publication H-06-090808, for example). This is an amorphous material, which is characterized by low thermal conductivity, a high refractive index, and high transparency. It also can be formed into a film at a high rate, and has excellent mechanical properties and moisture resistance. Because of its outstanding characteristics, $(ZnS)_{80}(SiO_2)_{20}$ has seen practical use as a material that is extremely well suited to forming dielectric layers.

The first and second interface layers are provided for the purpose of preventing the sulfur (S) in the $(ZnS)_{80}(SiO_2)_{20}$ from diffusing into the recording layer when the recording layer is irradiated with laser light and repeated rewrite recording is performed. If the sulfur (S) diffuses into the recording layer, it markedly lowers the reflectivity of the medium, and the repeated rewrite characteristics of the recording medium are greatly compromised. A material containing $ZrO_2$ and $Cr_2O_3$, for example, has been disclosed as the material for these interface layers (see Japanese Laid-Open Patent Application 2003-323743, for example). This material, containing no sulfur (S), is very transparent to a laser whose wavelength is in the blue-violet color band (near 405 nm), and has a high melting point, so the material also has high heat resistance.

The functions of the reflective layer are, optically, to increase the amount of light absorbed by the recording layer, and thermally, to quickly diffuse the heat produced in the recording layer to quench the recording layer, and facilitate a change to an amorphous state. Another function is to protect the recording layer, interface layers, and dielectric layers from the environment in which they are used. Therefore, a silver alloy, having high thermal conductivity, can be used favorably as the material for a reflective layer.

The function of the third interface layer is to prevent the sulfur (S) in the $(ZnS)_{80}(SiO_2)_{20}$ from diffusing into the reflective layer when $(ZnS)_{80}(SiO_2)_{20}$ is used for the second dielectric layer and a silver alloy is used for the reflective layer. If sulfur (S) does diffuse into the reflective layer, it will react with the silver in the silver alloy, producing $Ag_2S$. This $Ag_2S$ is produced even in an environment of normal temperature and normal humidity, and markedly diminishes the reliability of the medium. The material of this third interface layer can be a dielectric other than a sulfide, or a metal other than silver, semimetal, or semiconductor.

The inventors discovered that a number of problems are caused by using a dielectric containing sulfur (S) for the second dielectric layer and providing both a second interface layer and a third interface layer.

One of the things the third interface layer does is to slow down the diffusion of heat produced in the recording layer. A good cooling effect in an information recording medium facilitates the change to an amorphous state, and results in good recording marks being obtained. Silver has the highest thermal conductivity of all elements, but as mentioned above, a silver alloy cannot be used for the third interface layer. Therefore, providing a third interface layer reduces the cooling effect on the recording layer. Also, if multiple layers of different materials are used for the interface layer, or if its thickness is increased, in an effort to improve how well elements are prevented from diffusing into one another, the cooling effect will suffer even more, quenching will be more difficult, and signal quality will decrease. Furthermore, providing a third interface layer increases the number of layers that make up the medium. Increasing the number of layers leads to an increased investment in equipment for manufacturing the medium, or results in a longer manufacturing takt time, which drives up the cost of the medium.

Similarly, providing the second interface layer decreases the cooling effect, and drives up the cost of the medium.

DISCLOSURE OF INVENTION

The present invention solves the above problems, and it is an object thereof to provide a dielectric material that contains no sulfur (S), has good transparency to a laser whose wavelength is in the blue-violet color band, and has excellent moisture resistance. It is a further object to provide an information recording medium in which this dielectric material is applied to the second dielectric layer, thereby eliminating the need for the second and third interface layers, and which has high signal quality and excellent recording sensitivity and repeated rewrite characteristics.

To achieve the stated objects, the information recording medium of the present invention comprises an oxide-fluoride dielectric layer that includes indium (In), an element M1 (where M1 is at least one element selected from among Zr, Hf, Y, Ti, Nb, Ta, Cr, Ga, and Si), oxygen (O), an element M2 (where M2 is at least one element selected from among La, Ce, Pr, Nd, Gd, Tb, Dy, Ho, Er, Yb, Mg, Ca, and Sr), and fluorine (F).

With the method of the present invention for manufacturing an information recording medium, the oxide-fluoride dielectric layer is formed using a sputtering target that includes indium (In), an element M1 (where M1 is at least one element selected from among Zr, Hf, Y, Ti, Nb, Ta, Cr, Ga, and Si), oxygen (O), an element M2 (where M2 is at least one element selected from among La, Ce, Pr, Nd, Gd, Tb, Dy, Ho, Er, Yb, Mg, Ca, and Sr), and fluorine (F).

With the information recording medium of the present invention, even though no interface layer is provided between the reflective layer and the dielectric layer, an information recording medium can still be provided which has high signal quality and excellent recording sensitivity and repeated rewrite characteristics. Also, with the method of the present invention for manufacturing an information recording medium, an information recording medium that exhibits the above-mentioned effects can be produced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

Referring now to the attached drawings which form a portion of this original disclosure.

Figure 1:
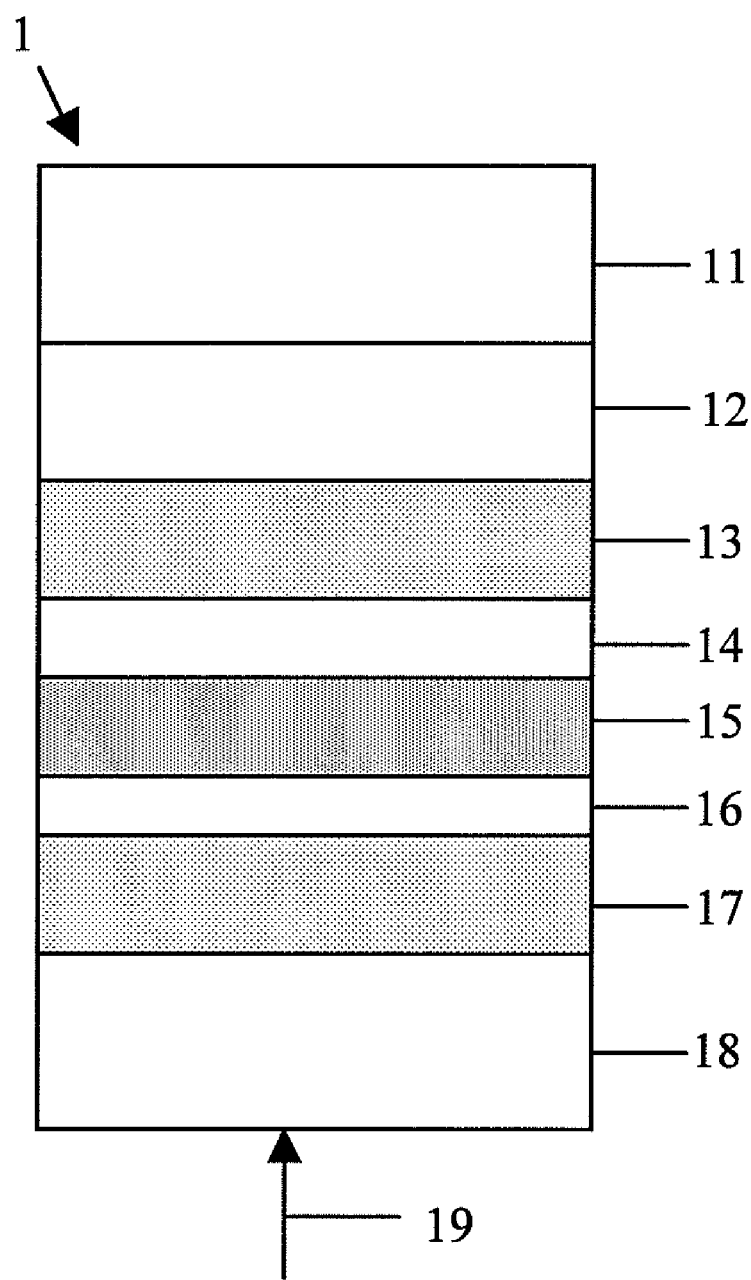
FIG. 1 is a partial cross section of an information recording medium 1 in Embodiment 1 of the present invention.

EXPLANATION OF REFERENCE 1, 2, 3, 4, 55, 607, 5 information recording medium
301, 302, 501, 502, 503, 504 information layer
50 recording and reproduction device
11, 43, 601 substrate
12, 33, 85 reflective layer
13, 34, 86 second dielectric layer
14 second interface layer
15, 35, 605, 87 recording layer
16, 88 first interface layer
17, 37, 89 first dielectric layer
18 cover layer
19 energy beam (laser beam)
31, 81, 82, 83 optical separation layer
32, 84 transmissivity adjustment layer
36 interface layer
41 dummy substrate
42 adhesive layer
51 spindle motor
52 semiconductor laser
53 optical head
54 objective lens
56 laser beam
602 lower electrode
603 recording component
604 upper electrode
606 dielectric layer
608 pulse generator
609 resistance measurement device
610, 611 switch
612 printing component
613 determination component
614 electrical write/read device

BEST MODE FOR CARRYING OUT THE INVENTION

A preferred embodiment of the present invention will now be explained with reference to the drawings. It will be apparent to those skilled in the art from this disclosure that the following descriptions of the embodiment of the present invention is provided for illustration only and not for the purpose of limiting the invention as defined by the appended claims and their equivalents.

Embodiment 1

An example of an information recording medium that uses a laser beam to record and reproduce information will be described as Embodiment 1 of the present invention. FIG. 1 is a partial cross section of the optical information recording medium thereof.

The information recording medium 1 shown in FIG. 1 is formed by laminating a reflective layer 12, a second dielectric layer 13, a second interface layer 14, a recording layer 15, a first interface layer 16, a first dielectric layer 17, and a cover layer 18 in that order over the surface of a substrate 11. This information recording medium is irradiated with a recording/reproduction energy beam (generally a laser beam) 19 from the first dielectric layer 17 side.

The cover layer 18 is composed, for example, of a photocuring resin (and especially a UV-curing resin), a delayed heat-curing resin, or another such resin, or a dielectric, and it preferably absorbs little of the laser light being used. The cover layer 18 can also be made of glass or a resin such as polycarbonate, amorphous polyolefin, or polymethyl methacrylate (PMMA). When one of these materials is used, the cover layer 18 is formed by bonding it to the first dielectric layer 17 with a photo-curing resin (and especially a UV-curing resin), a delayed heat-curing resin, or another such resin.

The substrate 11 is a disk-shaped transparent substrate. The material of the substrate 11 can be, for example, polycarbonate, amorphous polyolefin, polymethyl methacrylate (PMMA), or another such resin, or glass. If needed, a guide groove (with a track pitch of 0.32 μm) for guiding the laser beam may be formed on the surface of the substrate 11 on the recording layer 15 side. The side of the substrate 11 opposite to the recording layer 15 is preferably smooth. The thickness of the substrate 11 is about 500 to 1300 μm, but the thickness of the substrate 11 is preferably within a range of 1050 to 1150 μm, particularly when the thickness of the cover layer 18 is about 100 μm (this thickness affords good recording and reproduction at a NA of 0.85).

The recording layer 15 is composed of a material that undergoes a reversible phase change between the crystalline and amorphous phases when irradiated with a laser beam, for example. This is a material expressed by the formula $Ge_pM5_qM6_rTe_{100-(p+q+r)}$ (atom %), for example. With a material such as this, a recording film can be formed with which the amorphous phase is stable, the signal amplitude is large, and there is less decrease in crystallization rate or increase in melting point. Here, M5 is an element selected from among Sb and Bi. M6 is an element selected from among Si, Ti, V, Fe, Co, Ni, Cu, Zr, Nb, Mo, Se, Ru, Rs, Pd, Mn, Ag, Al, Cr, Sn, Ga, In, Ta, Dy, Gd, Td, Os, Ir, W, Pt, and Au. p preferably satisfies $30 \leq p \leq 50$, and even more preferably $35 \leq p \leq 48$. q preferably satisfies $0 \leq q \leq 20$. r preferably satisfies $0 \leq r \leq 20$. The variables also preferably satisfy $35 \leq p+q+r \leq 60$. To obtain good recording characteristics, the thickness of the recording layer 15 is preferably between 5 and 15 nm. If the recording layer 15 is too thick, the diffusion of heat in the in-plane direction will result in a significant thermal effect on the adjacent regions. If the recording layer 15 is too thin, though, the reflectivity of the information recording medium 1 will be too low, therefore the thickness is preferably from 8 to 12 nm.

The recording layer 15 can be formed, for example, from a material that includes antimony (Sb) and M7 (where M7 is at least one element selected from among Mn, Ga, Ge, Se, Ag, In, Sn, Te, Pb, Bi, and Au). More specifically, the recording layer 15 can be formed from a material expressed by $Sb_s M7_{100-s}$ (atom %). If s satisfies $50 \leq s \leq 95$, then a large difference in the reflectivity of the information recording medium 1 can be achieved between when the recording layer 15 is in its crystalline phase and when it is in its amorphous phase, and better recording and reproduction characteristics can be obtained. If $75 \leq s \leq 95$, the crystallization rate will be particularly fast, and good rewrite performance will be obtained at a high transfer rate. Also, if $50 \leq s \leq 75$, the amorphous phase will be particularly stable, and good recording performance will be obtained at a low transfer rate.

Also, the recording layer 15 can be formed from an irreversible phase changing material. TeOx+M8 (where M8 is an element such as Pd or Ge) can be used favorably as this irreversible phase changing material, as disclosed in Japanese Patent Publication H7-25209 (U.S. Pat. No. 2,006,849), for example. When the recording layer is made of an irreversible phase changing material, the result will be a write-once type of information recording medium that can be written to only one time, but the present invention can be applied favorably even to an information recording medium such as this because it improves the recording sensitivity and signal storage stability.

An opto-magnetic material with which recording, erasure, and reproduction are performed by applying a magnetic field and irradiating with light, without relying on phase change, may also be used for the recording layer 15. This material can be one that includes at least one element from the rare earth metal group consisting of Tb, Gd, Dy, Nd, and Sm, and at least one element from the transition metal group consisting of Sc, Cr, Fe, Co, and Ni. More specifically, examples include Tb—Fe, Te—Fe—Co, Gd—Fe, Gd—Fe—Co, Dy—Fe—Co, Nd—Fe—Co, Sm—Co, Tb—Fe—Ni, Gd—Tb—Fe—Co, and Dy—Sc—Fe—Co. When an opto-magnetic material is used for the recording layer, the structure of the information recording medium will not necessarily be the same as what is shown in FIG. 1, but it is preferable to use the same interface layer structure and materials on both sides of the recording layer in the present invention.

The reflective layer 12 has the optical function of increasing the amount of light absorbed by the recording layer 15. The reflective layer 12 also has the thermal function of quickly diffusing the heat produced in the recording layer 15 to facilitate the change of the recording layer 15 to an amorphous state. The reflective layer 12 also functions to protect the multilayer film from the environment in which it is used.

Examples of materials that can be used for the reflective layer 12 include non-alloyed metals with high thermal conductivity, such as silver, gold, copper, aluminum, platinum, titanium, and tungsten. It is also possible to use aluminum alloys produced by adding chromium, nickel, titanium, or the like to aluminum; gold alloys produced by adding copper, chromium, neodymium, or the like to gold; silver alloys produced by adding copper, palladium, indium, neodymium, or the like to silver; silver alloys produced by adding palladium, titanium, ruthenium, aluminum, gold, nickel, neodymium, calcium, gallium, indium, gadolinium, yttrium, or the like to Ag—Cu; silver alloys produced by adding gold, palladium, or the like to Ag—Nd; silver alloys produced by adding tin, gallium, or the like to Ag—In; and the alloys Ag—Ga—Sn, Ag—Ga—Y, Ag—Ga—Al, Ag—Zn—Al, and Cu—Si. Silver alloys are particularly favorable as the material of the reflective layer 12 because of their high thermal conductivity. The added concentration is preferably 3 atom % or less. The thickness of the reflective layer 12 is preferably at least 30 nm, at which the thermal diffusion function will be adequate. Even within this range, if the reflective layer 12 is thicker than 240 nm, its thermal diffusion function will be too great, and recording sensitivity will decrease. Therefore, the thickness of the reflective layer 12 is preferably within a range of 30 to 240 nm.

The second interface layer 14 and the first interface layer 16 serve as barriers that prevent the diffusion of elements and the admixture of moisture into the recording layer. Since they are provided in contact with the recording layer 15, they also have the effect of promoting or suppressing the crystallization of the recording layer, and they preferably have good adhesion to the recording layer 15 composed of a chalcogenide material. A material with little optical absorption is preferably used for these interface layers, and materials that can be used for the interface layers 14 and 16 include $ZrO_2$, $HfO_2$, $SiO_2$, MgO, $Cr_2O_3$, $Ga_2O_3$, $In_2O_3$, $Y_2O_3$, $Al_2O_3$, and other such oxides; C—N, Ti—N, Zr—N, Nb—N, Ta—N, Si—N, Ge—N, Cr—N, Al—N, Ge—Si—N, Ge—Cr—N, and other such nitrides; SiC and other such carbides; and $LaF_3$, $CeF_3$, $YF_3$, and other such fluorides. A mixture of components selected from these may also be used. Examples of such mixtures include $ZrO_2$—$Y_2O_3$ (stabilized zirconia or partially stabilized zirconia) in which $Y_2O_3$ is added to stabilize the $ZrO_2$, as well as $ZrO_2$—$Cr_2O_3$, $ZrO_2$—$SiO_2$—$Cr_2O_3$, $ZrO_2$—$Y_2O_3$—$Cr_2O_3$, $ZrO_2$—$In_2O_3$, $ZrO_2$—$SiO_2$—$In_2O_3$, $ZrO_2$—$Y_2O_3$—$In_2O_3$, $HfO_2$—$SiO_2$—$Cr_2O_3$, and $ZrO_2$—$SiO_2$—$Cr_2O_3$—$LaF_3$. The thickness of the interface layers 14 and 16 is preferably from 1 to 12 nm. If the interface layers are too thin, their effect as barriers will be insufficient, which can lead to the diffusion of elements and the admixture of moisture into the recording layer, and this would adversely affect signal quality. If the layers are too thick, though, their effect of promoting or suppressing the crystallization of the recording layer will be too great, and this adversely affects recording and reproduction characteristics. Therefore, the thickness is even more preferably 3 to 10 nm.

The first dielectric layer 17 serves to protect the recording layer 15 from moisture and the like, to raise the optical absorbancy of the recording layer 15 by adjusting the optical distance, and to increase the signal amplitude by increasing the proportional change in the amounts of reflected light before and after recording. The first dielectric layer 17 can be made of $TiO_2$, $ZrO_2$, $HfO_2$, $SiO_2$, MgO, ZnO, $Nb_2O_5$, $Ta_2O_5$, $Al_2O_3$, and other such oxides; or C—N, Ti—N, Zr—N, Nb—N, Ta—N, Si—N, Ge—N, Cr—N, Al—N, Ge—Si—N, Ge—Cr—N, and other such nitrides. ZnS and other such sulfides, and SiC and other such carbides can also be used. Mixtures of the above materials can also be used. An oxide-fluoride dielectric can also be used in the present invention (this will be described in detail for the second dielectric layer 13 below). Of these materials, a mixture of ZnS and $SiO_2$ is particularly excellent as the material used for the first dielectric layer 17 because it is an amorphous material, forms a film quickly, has a high refractive index, and has good mechanical strength and moisture resistance. The thickness of the first dielectric layer 17 can be determined by calculation based on the matrix method, under conditions in which the proportional change in the amounts of reflected light when the recording layer 15 is in its crystalline phase and when it is in its amorphous phase is increased, and optical absorption by the recording layer 15 is increased. Specifically, the thickness is preferably within a range of 10 to 150 nm, and more preferably within a range of 30 to 80 nm.

The second dielectric layer 13 is one of the characteristic features of the present invention. The second dielectric layer 13 is similar to the first dielectric layer 17 in that it serves to raise the optical absorbancy of the recording layer 15 by adjusting the optical distance, and to increase the signal amplitude by increasing the proportional change in the amounts of reflected light before and after recording. It also serves to quickly diffuse the heat produced in the recording layer 15 to the reflective layer 12, and thereby cool the recording layer 15. When this thermal diffusion effect is excellent, there is less thermal load on the recording layer 15, and better repeated rewrite characteristics are obtained.

The second dielectric layer 13 can be made of the same materials as those listed above for the first dielectric layer 17, of which it is particularly favorable to use an oxide-fluoride dielectric in the present invention. This oxide-fluoride dielectric includes indium (In), an element M1 (where M1 is at least one element selected from among Zr, Hf, Y, Ti, Nb, Ta, Cr, Ga, and Si), oxygen (O), an element M2 (where M2 is at least one element selected from among La, Ce, Pr, Nd, Gd, Tb, Dy, Ho, Er, Yb, Mg, Ca, and Sr), and fluorine (F).

Because this oxide-fluoride dielectric contains an indium oxide composed of indium and oxygen, adhesion to the reflective layer material and the recording layer material is improved, and the weather resistance and moisture resistance of the information recording medium are enhanced. However, an indium oxide is very absorbent to light with a wavelength is in the blue-violet band or the red band. When an optically absorbent dielectric such as this is used for a dielectric layer, laser light is lost outside of the recording layer, so higher recording power is required. In other words, the recording sensitivity is adversely affected. Also, heat builds up in the dielectric layer because of the absorption of laser light by the dielectric layer, and it is possible that this heat will adversely affect the rewrite characteristics. Adding the element M1, oxygen, the element M2, and fluorine was conceived as a way to ameliorate this problem.

Because the oxide-fluoride dielectric contains an M1 oxide composed of the element M1 and oxygen, the transparency of the dielectric is improved or its melting point is raised. Thus, heat will not build up in the dielectric layer, and heat resistance will be excellent, so the rewrite characteristics of the information recording medium are enhanced. Oxides of titanium and chromium afford superior adhesion with the recording layer material or the reflective layer material, and improve the weather resistance and moisture resistance of the information recording medium.

The oxide-fluoride dielectric is characterized in that most of the elements M2 have a large ion radius, and an M2 fluoride composed of the element M2 and fluorine exhibits poor solubility in water, and is thought to improve moisture resistance. Also, it was believed that the structure of the dielectric could be made more complex by mixing the oxide and fluoride in the oxide-fluoride dielectric, thereby lowering thermal conductivity and allowing recording marks to be written distinctly at a low recording power without heat escaping in-plane. This means that recording sensitivity is increased. However, if thermal conductivity is reduced too much, quenching will be excessive and rewrite characteristics will suffer, so the proportional contents need to be adjusted to strike a good balance between recording sensitivity and rewrite characteristics.

When indium, an element M1, oxygen, an element M2, and fluorine are thus contained in a good balance, a dielectric can be obtained that satisfies requirements for good adhesion, high heat resistance, high transparency, and low thermal conductivity. It is therefore possible to obtain an information recording medium that has good weather resistance and moisture resistance (good adhesion with at the interface), excellent recording sensitivity, and good rewrite characteristics.

More specifically, the following are examples of combinations of elements that constitute the above-mentioned oxide-fluoride dielectric: In—Zr—O—La—F, In—Zr—O—Ce—F, In—Zr—O—Nd—F, In—Zr—O—Dy—F, In—Hf—O—La—F, In—Hf—O—Ce—F, In—Hf—O—Nd—F, In—Hf—O—Dy—F, In—Y—O—La—F, In—Y—O—Ce—F, In—Y—O—Nd—F, In—Y—O—Dy—F, In—Ti—O—La—F, In—Ti—O—Ce—F, In—Ti—O—Nd—F, In—Ti—O—Dy—F, In—Cr—O—La—F, In—Cr—O—Ce—F, In—Cr—O—Nd—F, In—Cr—O—Dy—F, In—Si—O—La—F, In—Si—O—Ce—F, In—Si—O—Nd—F, In—Si—O—Dy—F, In—Zr—Y—O—La—F, In—Zr—Y—O—Ce—F, In—Zr—O—La—F, In—Zr—Cr—O—Ce—F, In—Zr—Si—O—La—F, In—Zr—Si—O—Ce—F, In—Hf—Y—O—La—F, In—Hf—Y—O—Ce—F, In—Hf—Cr—O—La—F, In—Hf—Cr—O—Ce—F, In—Hf—Si—O—La—F, In—Hf—Si—O—Ce—F, In—Y—Cr—O—La—F, In—Y—Cr—O—Ce—F, In—Cr—Si—O—La—F, In—Cr—Si—O—Ce—F, In—Zr—Y—Si—O—La—F, In—Zr—Y—Si—O—Ce—F, In—Zr—Y—Cr—O—La—F, In—Zr—Y—Cr—O—Ce—F, In—Zr—Cr—Si—O—La—F, In—Zr—Cr—Si—O—Ce—F, In—Zr—Y—Cr—Si—O—La—F, In—Zr—Y—Cr—Si—O—Ce—F, In—Zr—O—La—Ce—F, In—Zr—O—La—Nd—F, In—Zr—O—La—Dy—F, In—Hf—O—La—Ce—F, In—Y—O—La—Ce—F, In—Ti—O—La—Ce—F, In—Cr—O—La—Ce—F, In—Si—O—La—Ce—F, In—Zr—O—La—Ce—Nd—F, In—Zr—O—La—Ce—Dy—F, In—Zr—Y—O—La—Ce—F, In—Zr—Cr—O—La—Ce—F, In—Zr—Si—O—La—Ce—F, In—Zr—Y—Cr—O—La—Ce—F, In—Zr—Y—Si—O—La—Ce—F, In—Zr—Cr—Si—O—La—Ce—F, and In—Zr—Y—Cr—Si—O—La—Ce—F.

It is also possible for the indium and oxygen to be in a stable form of $In_2O_3$ in the thin film. The oxide-fluoride dielectrics listed as specific examples above can also be present in the form of $In_2O_3$—$ZrO_2$—$LaF_3$, $In_2O_3$—$ZrO_2$—$CeF_3$, $In_2O_3$—$ZrO_2$—$NdF_3$, $In_2O_3$—$ZrO_2$—$DyF_3$, $In_2O_3$—$HfO_2$—$LaF_3$, $In_2O_3$—$HfO_2$—$CeF_3$, $In_2O_3$—$HfO_2$—$NdF_3$, $In_2O_3$—$HfO_2$—$DyF_3$, $In_2O_3$—$Y_2O_3$—$LaF_3$, $In_2O_3$—$Y_2O_3$—$CeF_3$, $In_2O_3$—$Y_2O_3$—$NdF_3$, $In_2O_3$—$Y_2O_3$—$DyF_3$, $In_2O_3$—$TiO_2$—$LaF_3$, $In_2O_3$—$TiO_2$—$CeF_3$, $In_2O_3$—$TiO_2$—$NdF_3$, $In_2O_3$—$TiO_2$—$DyF_3$, $In_2O_3$—$Cr_2O_3$—$LaF_3$, $In_2O_3$—$Cr_2O_3$—$CeF_3$, $In_2O_3$—$Cr_2O_3$—$NdF_3$, $In_2O_3$—$Cr_2O_3$—$DyF_3$, $In_2O_3$—$SiO_2$—$LaF_3$, $In_2O_3$—$SiO_2$—$CeF_3$, $In_2O_3$—$SiO_2$—$NdF_3$, $In_2O_3$—$SaO_2$—$DyF_3$, $In_2O_3$—$ZrO_2$—$Y_2O_3$—$LaF_3$, $In_2O_3$—$ZrO_2$—$Y_2O_3$—$CeF_3$, $In_2O_3$—$ZrO_2$—$Cr_2O_3$—$LaF_3$, $In_2O_3$—$ZrO_2$—$Cr_2O_3$—$CeF_3$, $In_2O_3$—$ZrO_2$—$SiO_2$—$LaF_3$, $In_2O_3$—$ZrO_2$—$SiO_2$—$CeF_3$, $In_2O_3$—$ZrSiO_4$—$LaF_3$, $In_2O_3$—$ZrSiO_4$—$CeF_3$, $In_2O_3$—$HfO_2$—$Y_2O_3$—$LaF_3$, $In_2O_3$—$HfO_2$—$Y_2O_3$—$CeF_3$, $In_2O_3$—$HfO_2$—$Cr_2O_3$—$LaF_3$, $In_2O_3$—$HfO_2$—$Cr_2O_3$—$CeF_3$, $In_2O_3$—$HfO_2$—$SiO_2$—$LaF_3$, $In_2O_3$—$HfO_2$—$SiO_2$—$CeF_3$, $In_2O_3$—$Y_2O_3$—$Cr_2O_3$—$LaF_3$, $In_2O_3$—$Y_2O_3$—$Cr_2O_3$—$CeF_3$, $In_2O_3$—$Cr_2O_3$—$SiO_2$—$LaF_3$, $In_2O_3$—$Cr_2O_3$—$SiO_2$—$CeF_3$, $In_2O_3$—$ZrO_2$—$Y_2O_3$—$SiO_2$—$LaF_3$, $In_2O_3$—$ZrO_2$—$Y_2O_3$—$SiO_2$—$CeF_3$, $In_2O_3$—$ZrO_2$—$Y_2O_3$—$Cr_2O_3$—$LaF_3$, $In_2O_3$—$ZrO_2$—$Y_2O_3$—$Cr_2O_3$—$CeF_3$, $In_2O_3$—$ZrO_2$—$Cr_2O_3$—$SiO_2$—$LaF_3$, $In_2O_3$—$ZrO_2$—$Cr_2O_3$—$SiO_2$—$CeF_3$, $In_2O_3$—$ZrO_2$—$Y_2O_3$—$Cr_2O_3$—$SiO_2$—$LaF_3$, $In_2O_3$—$ZrO_2$—$Y_2O_3$—$Cr_2O_3$—$SiO_2$—$CeF_3$, $In_2O_3$—$ZrO_2$—$LaF_3$—$CeF_3$, $In_2O_3$—$ZrO_2$—$LaF_3$—$NdF_3$, $In_2O_3$—$ZrO_2$—$LaF_3$—$DyF_3$, $In_2O_3$—$HfO_2$—$LaF_3$—$CeF_3$, $In_2O_3$—$Y_2O_3$—$LaF_3$—$CeF_3$, $In_2O_3$—$TiO_2$—$LaF_3$—$CeF_3$, $In_2O_3$—$Cr_2O_3$—$LaF_3$—$CeF_3$, $In_2O_3$—$SiO_2$—$LaF_3$—$CeF_3$, $In_2O_3$—$ZrO_2$—$LaF_3$—$CeF_3$—$NdF_3$, $In_2O_3$—$ZrO_2$—$LaF_3$—$CeF_3$—$DyF_3$, $In_2O_3$—$ZrO_2$—$Y_2O_3$—$LaF_3$—$CeF_3$, $In_2O_3$—$ZrO_2$—$Cr_2O_3$—$LaF_3$—$CeF_3$, $In_2O_3$—$ZrO_2$—$SiO_2$—$LaF_3$—$CeF_3$, $In_2O_3$—$ZrSiO_4$—$LaF_3$—$CeF_3$, $In_2O_3$—$ZrO_2$—$Y_2O_3$—$Cr_2O_3$—$LaF_3$—$CeF_3$, $In_2O_3$—$ZrO_2$—$Y_2O_3$—$SiO_2$—$LaF_3$—$CeF_3$, $In_2O_3$—$ZrO_2$—$Cr_2O_3$—$SiO_2$—$LaF_3$—$CeF_3$, and $In_2O_3$—$ZrO_2$—$Y_2O_3$—$Cr_2O_3$—$SiO_2$—$LaF_3$—$CeF_3$.

To obtain good recording sensitivity, repeated rewrite characteristics, and adhesion, when the oxide-fluoride dielectric is expressed by the formula $In_aM1_bO_cM2_dF_{100-a-b-c-d}$ (atom %), it is preferable if the following are satisfied: $3 \leq a \leq 38$, $3 \leq b \leq 38$, $10 \leq c \leq 60$, $1 \leq d \leq 35$, and $a+b+c+d<100$. When the oxide-fluoride dielectric is expressed by the formula $(In_2O_3)_j(D1)_k(D2)_{100-j-k}$ (mol %), it is preferable if the following are satisfied $20 \leq j \leq 85$, $20 \leq k \leq 85$, and $j+k<100$. The thickness of the second dielectric layer 13 can be determined by calculation based on the matrix method, just as with the first dielectric layer 17. More specifically, the thickness is preferably within a range of 3 to 75 nm, and more preferably a range of 5 to 40 nm.

A method for manufacturing the information recording medium 1 described in this embodiment will now be described.

The reflective layer 12, the second dielectric layer 13, the second interface layer 14, the recording layer 15, the first interface layer 16, and the first dielectric layer 17 can be formed by sputtering, which is a vapor phase film formation method.

First, the substrate 11 (with a thickness of 1100 μm, for example) is disposed in a film formation apparatus.

Then, the reflective layer 12 is formed first. If a guide groove has been formed in the substrate 11 at this point, the reflective layer 12 is formed on the side where this guide groove is located. The reflective layer 12 is formed by sputtering a target composed of the metal or alloy that constitutes the reflective layer 12, in an argon gas atmosphere, or in a mixed gas atmosphere of argon and a reaction gas (such as oxygen gas or nitrogen gas).

Then, the second dielectric layer 13 is formed over the reflective layer 12. The second dielectric layer 13 can be formed by sputtering a target containing indium (In), an element M1, oxygen (O), an element M2, and fluorine, in an argon gas atmosphere, or in a mixed gas atmosphere of argon and a reaction gas. More specifically, the sputtering target of this mixture is preferably expressed, for example, by the formula $In_aM1_bO_cM2_dF_{100-a-b-c-d}$ (atom %), and satisfies $3 \leq a \leq 38$, $3 \leq b \leq 38$, $10 \leq c \leq 60$, $1 \leq d \leq 35$, and $a+b+c+d<100$. The second dielectric layer 13 can be formed using a sputtering target expressed by the formula $(In_2O_3)_j(D1)_k(D2)_{100-j-k}$ (mol %) (where $20 \leq j \leq 85$, $20 \leq k \leq 85$, and $j+k<100$), and can also be formed by simultaneously sputtering a plurality of targets containing the necessary dielectrics among $In_2O_3$, D1, and D2.

Then, the second interface layer 14 is formed over the second dielectric layer 13. The second interface layer 14 can be formed by sputtering a target composed of a mixture of the dielectrics constituting the second interface layer 14, in an argon gas atmosphere, or in a mixed gas atmosphere of argon and a reaction gas. Alternatively, it can be formed by reactive sputtering in a mixed gas atmosphere of argon and a reaction gas, using a sputtering target containing the constituent metal elements.

Then, the recording layer 15 is formed over the second interface layer 14. The recording layer 15 can be formed by sputtering a target composed of a Ge-M5-Te-M6 alloy, according to the desired composition, in an argon gas atmosphere, a krypton gas atmosphere, a mixed gas atmosphere of argon and a reaction gas, or a mixed gas atmosphere of krypton and a reaction gas.

Then, the first interface layer 16 is formed over the recording layer 15. The first interface layer 16 can be formed by sputtering a target composed of the compound constituting the first interface layer 16, in an argon gas atmosphere, or in a mixed gas atmosphere of argon and a reaction gas. Alternatively, it can be formed by reactive sputtering in a mixed gas atmosphere of argon and a reaction gas, using a sputtering target containing the constituent metal elements.

Then, the first dielectric layer 17 is formed over the first interface layer 16. The first dielectric layer 17 can be formed by sputtering a target composed of the compound constituting the first dielectric layer 17, in an argon gas atmosphere, or in a mixed gas atmosphere of argon and a reaction gas. Alternatively, it can be formed by reactive sputtering in a mixed gas atmosphere of argon and a reaction gas, using a sputtering target containing the constituent metal elements.

The power supply used in the above sputtering steps can be a direct current (DC) power supply or a radio frequency (RF) power supply, and the supplied power is from 1 W to 10 kW. Sputtering using a DC power supply is called DC sputtering, while sputtering using an RF power supply is called RF sputtering.

The pressure in the sputtering chamber is from 0.01 to 100 Pa during the sputtering.

Finally, the cover layer 18 is formed over the first dielectric layer 17. The cover layer 18 can be formed by spin coating the first dielectric layer 17 with a photo-curing resin (and especially a UV-curing resin), a delayed heat-curing resin, or another such resin, and then curing the resin. A substrate made of disk-shaped glass or a polycarbonate, amorphous polyolefin, polymethyl methacrylate (PMMA), or another such resin may also be used for the cover layer 18. In this case, it can be formed by coating the first dielectric layer 17 with a photo-curing resin (and especially a UV-curing resin), a delayed heat-curing resin, or another such resin, pressing the substrates together, spinning to spread out the resin uniformly, and then curing the resin.

Methods other than sputtering that can be used to form the various layers include vacuum vapor deposition, ion plating, chemical vapor deposition (CVD), and molecular beam epitaxy (MBE).

After the first dielectric layer 17 has been formed, or after the cover layer 18 has been formed, an initialization step may be performed as needed to crystallize the entire surface of the recording layer 15. This initialization can be accomplished by irradiation with a laser beam.

The above description focused on a rewritable type of information recording medium as an example, but this embodiment can be similarly applied to a write-once or read-only type of information recording medium as well. Also, the order in which the various layers are formed is not limited to the order given above.

Embodiment 2

Figure 2:
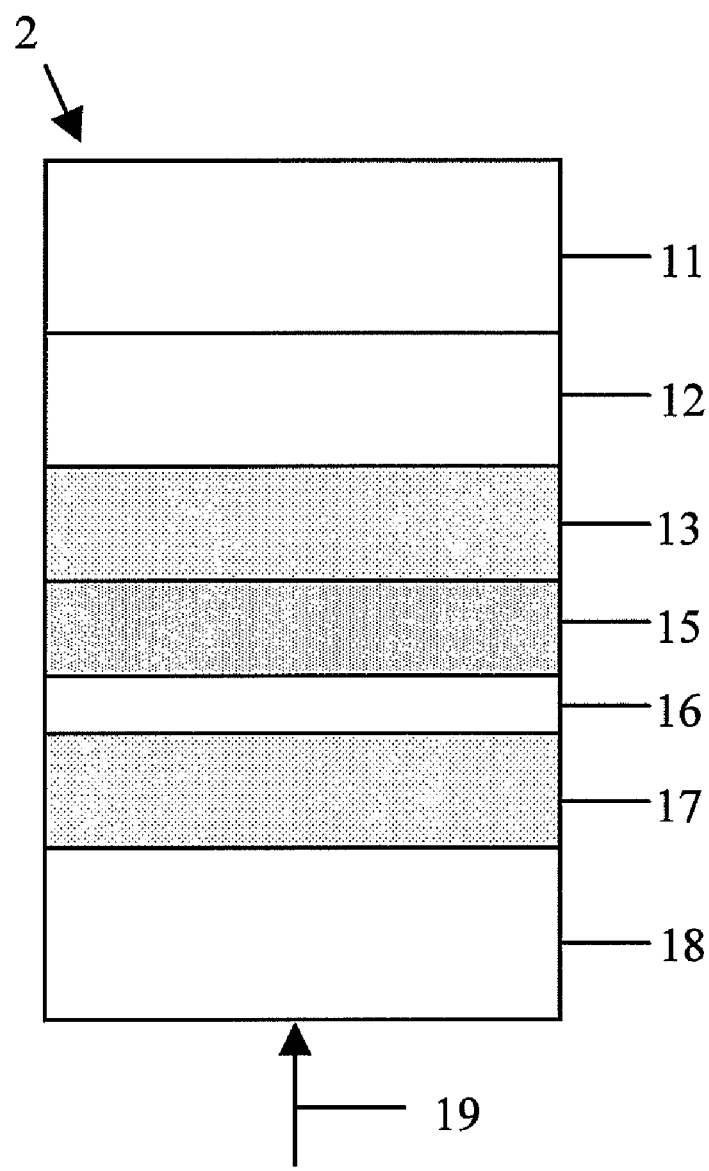
FIG. 2 is a partial cross section of an information recording medium 2 in Embodiment 2 of the present invention.

Another example of an information recording medium with which information is recorded and reproduced by using a laser beam will be described as Embodiment 2 of the present invention. FIG. 2 is a partial cross section of this optical information recording medium.

The information recording medium 2 shown in FIG. 2 is formed by laminating a reflective layer 12, a second dielectric layer 13, a recording layer 15, a first interface layer 16, a first dielectric layer 17, and a cover layer 18 in that order over the surface of a substrate 11. This information recording medium 2 is irradiated with a recording/reproduction energy beam (generally a laser beam) 19 from the first dielectric layer 17 side.

The substrate 11, reflective layer 12, recording layer 15, first interface layer 16, first dielectric layer 17, and cover layer 18 have the same materials, functions, and shapes as those discussed respectively in Embodiment 1.

The material of the second dielectric layer 13 is the same as that discussed in Embodiment 1. The function thereof is, in addition to that given in Embodiment 1, to promote or suppress the crystallization of the recording layer as provided in contact with the recording layer 15. It preferably has excellent adhesion to the recording layer 15 composed of a chalcogenide material. Just as in Embodiment 1, the thickness of the second dielectric layer 13 can be determined by calculation based on the matrix method. More specifically, the thickness is preferably within a range of 3 to 80 nm, and more preferably a range of 5 to 45 nm.

A method for manufacturing the information recording medium 2 described in this embodiment will now be described.

First, the substrate 11 (with a thickness of 1100 µm, for example) is disposed in a film formation apparatus.

Then, the reflective layer 12, second dielectric layer 13, recording layer 15, first interface layer 16, and first dielectric layer 17 are formed successively. The formation methods are the same as those given in Embodiment 1. Finally, the cover layer 18 is formed by the same method as in Embodiment 1.

After the first dielectric layer 17 has been formed, or after the cover layer 18 has been formed, an initialization step may be performed as needed to crystallize the entire surface of the recording layer 15. This initialization can be accomplished by irradiation with a laser beam.

The above description focused on a rewritable type of information recording medium as an example, but this embodiment can be similarly applied to a write-once or read-only type of information recording medium as well. Also, the order in which the various layers are formed is not limited to the order given above.

Embodiment 3

Figure 3:
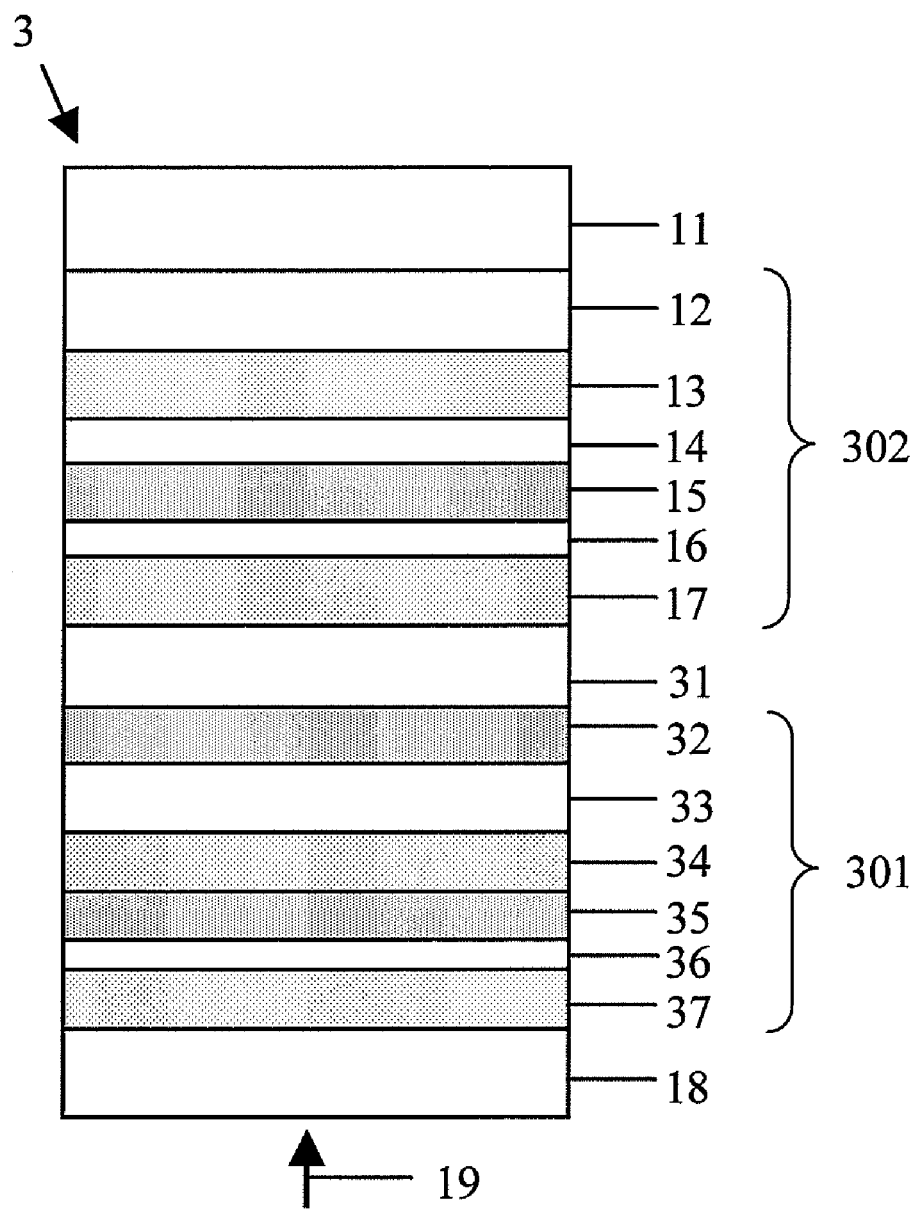
FIG. 3 is a partial cross section of an information recording medium 3 in Embodiment 3 of the present invention.

Another example of an information recording medium with which information is recorded and reproduced by using a laser beam will be described as Embodiment 3 of the present invention. FIG. 3 is a partial cross section of this optical information recording medium. The information recording medium 3 in this embodiment includes two information layers (referred to as information layer 301 and information layer 302) for recording and reproducing information, and is an information recording medium with which information can be recorded and reproduced to and from the information layers by irradiating one side of the medium with an energy beam (generally a laser beam) 19.

First, the structure of the information layer 302 will be described. The information layer 302 is formed by laminating a reflective layer 12, a second dielectric layer 13, a second interface layer 14, a recording layer 15, a first interface layer 16, and a first dielectric layer 17 in that order over the surface of a substrate 11. The substrate 11, reflective layer 12, second dielectric layer 13, second interface layer 14, recording layer 15, first interface layer 16, and first dielectric layer 17 have the same materials, functions, and shapes as those discussed respectively in Embodiment 1. The second interface layer 14 does not necessarily have to be provided to the information layer 302.

An optical separation layer 31 is composed of a photo-curing resin (and especially a UV-curing resin), a delayed heat-curing resin, or another such resin, a dielectric, or the like, and it preferably absorbs less of the laser light being used. The optical separation layer 31 is used to distinguish the focal positions of the information layer 301 and the information layer 302, and the thickness must be at least the focal depth $\Delta Z$, which is determined by the wavelength $\lambda$ of the laser beam and the numerical aperture (NA) of the objective lens. If we let the reference for the optical intensity of the focus be 80% of that in the case of no aberration, then $\Delta Z$ can be approximated by $\Delta Z = \lambda/\{2(NA)\}$. A guide groove may also be formed in the optical separation layer 31 on the side irradiated by the laser beam.

The structure of the information layer 301 will now be described. The information layer 301 is formed by laminating a transmissivity adjustment layer 32, a reflective layer 33, a second dielectric layer 34, a recording layer 35, an interface layer 36, and a first dielectric layer 37 in that order on the surface of the optical separation layer 31.

The reflective layer 33 can have the same material, function, and shape as those of the reflective layer 12 given in Embodiment 1.

The interface layer 36 can have the same material, function, and shape as those of the first interface layer 16 given in Embodiment 1.

The first dielectric layer 37 can have the same material, function, and shape as those of the first dielectric layer 17 given in Embodiment 1. Its thickness is preferably between 10 and 120 nm, and more preferably between 20 and 70 nm.

The second dielectric layer 34 can be made of the same materials as those listed for the second dielectric layer 13 and second interface layer 14 in Embodiment 1. The second dielectric layer 34 serves to raise the optical absorbancy of the recording layer 35 by adjusting the optical distance, and to increase the signal amplitude by increasing the proportional change in the amounts of reflected light before and after recording. It also serves to quickly diffuse the heat produced in the recording layer 35 to the reflective layer 33, and thereby cool the recording layer 35. The second dielectric layer 34 is provided in contact with the recording layer 35, so that it has also the effect of promoting or suppressing the crystallization of the recording layer. Its thickness is preferably between 3 and 75 nm, and more preferably between 5 and 40 nm.

The recording layer 35 can have the same material, function, and shape as those of the recording layer 15 given in Embodiment 1, but to raise transmissivity of laser light, this layer is preferably as thin as possible, and a thickness between 4 and 9 nm is especially favorable.

The transmissivity adjustment layer 32 serves to adjust the transmissivity of the information layer 301. Providing this layer allows both the transmissivity $T_c(\%)$ of the information layer 301 and the transmissivity $T_a$(%) of the information layer 301 to be raised, where the transmissivity $T_c$(%) is one when the recording layer is in its crystal phase and the transmissivity $T_a$(%) is one when the recording layer is in its amorphous phase. More specifically, when the transmissivity adjustment layer 32 is provided, $T_c$ and $T_a$ can be increased by 2 to 10% when there is no transmissivity adjustment layer 32. This layer also serves to quickly diffuse the heat produced in the recording layer 35 to the reflective layer 33, and thereby cool the recording layer 35. To further raise transmissivity, the refractive index n1 and attenuation coefficient k1 of the transmissivity adjustment layer 32 preferably satisfy n1≧2.0 and k1≦0.1, and more preferably satisfy 2.0≦n1≦3.0 and k1≦0.05. Materials that can be used for the transmissivity adjustment layer 32 include $TiO_2$, $ZrO_2$, $HfO_2$, ZnO, $Nb_2O_5$, $Ta_2O_5$, $Al_2O_3$, $Bi_2O_3$, $Y_2O_3$, $CeO_2$, and other such oxides, and Ti—N, Zr—N, Nb—N, Ta—N, Si—N, Ge—N, Cr—N, Al—N, Ge—Si—N, Ge—Cr—N, and other such nitrides. The thickness d1 of this layer preferably satisfies $(^1\!/_{16})\lambda/n1 \leq d1 \leq (^7\!/_{32})\lambda/n1$ or $(^9\!/_{16})\lambda/n1 \leq d1 \leq (^{21}\!/_{32})\lambda/n1$.

Finally, the cover layer 18 is formed over the first dielectric layer 37, thereby producing the information recording medium 3. The cover layer 18 can have the same materials, functions, and shapes as those discussed in Embodiment 1.

The information recording medium described in this embodiment is limited to two information layers, but an information recording medium can be produced by the same method and with the same structure when more of these information layers are provided, and the capacity of the information recording medium can be increased in this way. For example, when four information layers are provided, two additional layers that adjust the thickness of the various layers may be provided, with the same structure as the information layer 301, in between the information layer 301 and the cover layer 18, based on the structure of the information recording medium 3. The information layers may each be a rewrite, write-once, or read-only type.

A method for manufacturing the information recording medium 3 described in this embodiment will now be described.

First, the substrate 11 (with a thickness of 1100 μm, for example) is disposed in a film formation apparatus.

Then, to form the information layer 302, the reflective layer 12, second dielectric layer 13, second interface layer 14, recording layer 15, first interface layer 16, and first dielectric layer 17 are formed successively. The formation methods are the same as those given in Embodiment 1.

Then, the optical separation layer 31 is formed over the first dielectric layer 17. The optical separation layer 31 can be formed by spin coating with a photo-curing resin (and especially a UV-curing resin), a delayed heat-curing resin, or another such resin, and then curing the resin. When a guide groove is provided to the optical separation layer 31, a transfer substrate (mold) in the surface of which a groove of the desired shape has been formed is pressed against the uncured resin, and then the substrate 11 and the transfer substrate are spin coated, after which the resin is cured. Then, after this, the transfer substrate is cured and peeled away from the resin, thereby forming the optical separation layer 31 in which the required guide groove has been formed.

Then, the information layer 301 is formed. To form the information layer 301, first the transmissivity adjustment layer 32 is formed. The transmissivity adjustment layer 32 can be formed by sputtering a target composed of the dielectric constituting the transmissivity adjustment layer 32, in an argon gas atmosphere, or in a mixed gas atmosphere of argon and a reaction gas. Alternatively, it can be formed by reactive sputtering in a mixed gas atmosphere of argon and a reaction gas, using a sputtering target containing the constituent metal elements.

Then, the reflective layer 33 is formed over the transmissivity adjustment layer 32. The reflective layer 33 can be formed by the same method as the reflective layer 12 described in Embodiment 1.

Then, the second dielectric layer 34 is formed over the reflective layer 33. The second dielectric layer 34 can be formed by the same method as the second dielectric layer 13 or the second interface layer 14 described in Embodiment 1.

Then, the recording layer 35 is formed over the second dielectric layer 34. The recording layer 35 can be formed by the same method as the recording layer 15 described in Embodiment 1.

Then, the interface layer 36 is formed over the recording layer 35. The first interface layer 36 can be formed by the same method as the first interface layer 16 described in Embodiment 1.

Then, the first dielectric layer 37 is formed over the first interface layer 36. The first dielectric layer 37 can be formed by the same method as the first dielectric layer 17 described in Embodiment 1.

Finally, the cover layer 18 is formed over the first dielectric layer 37 by the same method as in Embodiment 1.

After the first dielectric layer 17 has been formed, or after the cover layer 18 has been formed, an initialization step may be performed as needed to crystallize the entire surface of the recording layer 15. Also, after the first dielectric layer 37 has been formed, or after the cover layer 18 has been formed, an initialization step may be performed as needed to crystallize the entire surface of the recording layer 35. In either case this initialization can be accomplished by irradiation with a laser beam.

The above description focused on a rewritable type of information recording medium as an example, but this embodiment can be similarly applied to a write-once or read-only type of information recording medium as well. Also, the order in which the various layers are formed is not limited to the order given above.

Embodiment 4

Figure 4:
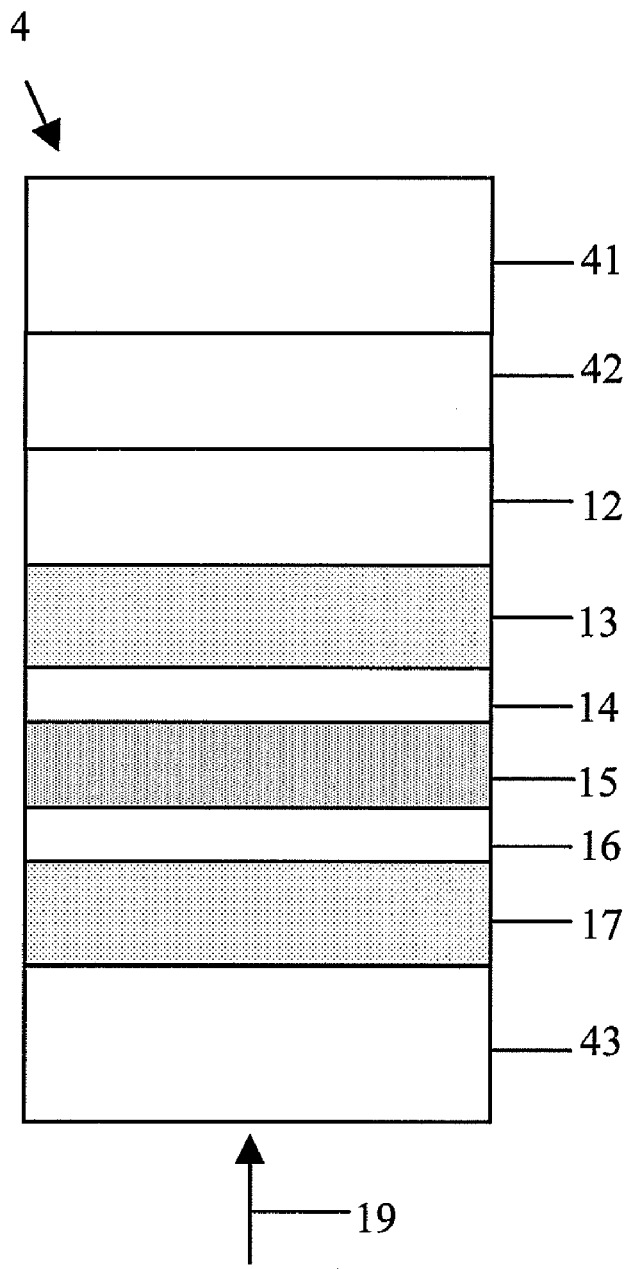
FIG. 4 is a partial cross section of an information recording medium 4 in Embodiment 4 of the present invention.

Another example of an information recording medium with which information is recorded and reproduced by using a laser beam will be described as Embodiment 4 of the present invention. FIG. 4 is a partial cross section of this optical information recording medium.

The information recording medium 4 shown in FIG. 4 is formed by laminating a first dielectric layer 17, a first interface layer 16, a recording layer 15, a second interface layer 14, a second dielectric layer 13, a reflective layer 12, an adhesive layer 42, and a dummy substrate 41 in that order over the surface of a substrate 43. This information recording medium is irradiated with a recording/reproduction energy beam (generally a laser beam) 19 from the first dielectric layer 17 side.

The substrate 43 and the dummy substrate 41 are transparent, disk-shaped substrates. The material of the substrate 43 and the dummy substrate 41 can be, for example, polycarbonate, amorphous polyolefin, polymethyl methacrylate (PMMA), or another such resin, or glass, just as with the substrate 11 in Embodiment 1. If needed, a guide groove (with a track pitch of 0.615 μm) for guiding the laser beam may be formed on the surface of the substrate 43 on the first dielectric layer 17 side. The opposite side of the substrate 43 from where the first dielectric layer 17 is located, and the opposite side of the dummy substrate 41 from where the adhesive layer 42 is located, are preferably smooth. The thickness of the substrate 43 and the dummy substrate 41 is preferably within a range of 0.3 to 0.9 mm so that the strength will be adequate and the thickness of the information recording medium 4 will be about 1.2 mm.

The adhesive layer 42 preferably is composed of a photo-curing resin (and especially a UV-curing resin), a delayed heat-curing resin, or another such resin, and absorbs little of the light from the laser beam 19 being used, and preferably has a low optical refractive index in the short wavelength band. The thickness of the adhesive layer 42 is preferably within a range of 0.6 to 50 µm, for the same reason as that given for the optical separation layer 31.

The reflective layer 12, second dielectric layer 13, recording layer 15, and first interface layer 16 have the same materials, functions, and shapes as those discussed respectively in Embodiment 1. The first dielectric layer 17 also has the same material, function, and shape as those discussed in Embodiment 1, and its thickness is preferably within a range of 30 to 250 nm, and more preferably within a range of 70 to 180 nm. The second dielectric layer 13 also has the same material, function, and shape as those discussed in Embodiment 1, and its thickness is preferably within a range of 10 to 100 nm, and more preferably within a range of 20 to 70 nm.

Next, a method for manufacturing the information recording medium described in this embodiment will be described.

First, the substrate 43 (with a thickness of 600 µm, for example) is disposed in a film formation apparatus.

Then, the first dielectric layer 17, the first interface layer 16, the recording layer 15, the second interface layer 14, the second dielectric layer 13, and the reflective layer 12 are formed in that order. The methods for forming these are the same as those given respectively in Embodiment 1.

Next, the substrate 43 on which the information layers have been laminated and the dummy substrate 41 (with a thickness of 600 µm, for example) are stuck together with the adhesive layer 42. More specifically, the dummy substrate 41 is coated with a photo-curing resin (and especially a UV-curing resin), a delayed heat-curing resin, or another such resin, the substrate 43 on which the information layers have been laminated is pressed over the dummy substrate 41, spin coating is performed, and the resin is cured. Also, the dummy substrate 41 can be uniformly coated ahead of time with a pressure-sensitive adhesive resin, and then pressed against the substrate 43 on which the information layers have been laminated.

After the substrate 43 and the dummy substrate 41 have been pressed together, an initialization step may be performed as needed to crystallize the entire surface of the recording layer 15. This initialization can be accomplished by irradiation with a laser beam.

The above description focused on a rewritable type of information recording medium as an example, but this embodiment can be similarly applied to a write-once or read-only type of information recording medium as well. Also, the order in which the various layers are formed is not limited to the order given above.

Embodiment 5

Figure 5:
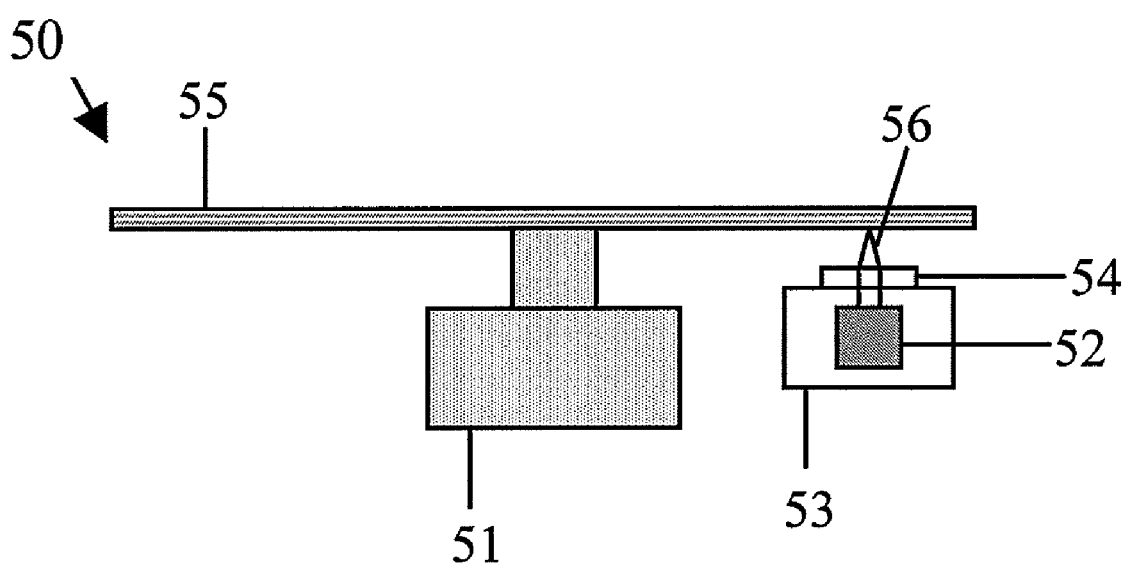
FIG. 5 is a simplified diagram of part of the structure of a recording and reproduction device for recording and reproducing information to and from the information recording medium of the present invention.

As Embodiment 5, a method for recording and reproducing information will be described for the information recording media 1 to 3 described in Embodiments 1 to 3. FIG. 5 is a simplified diagram of part of the structure of a recording and reproduction device 50 used in the recording and reproduction method of this embodiment. The recording and reproduction device 50 comprises a spindle motor 51 that rotates the information recording medium, an optical head 53 equipped with a semiconductor laser 52, and an objective lens 54 for converging a laser beam 56 emitted from the semiconductor laser 52.

The numerical aperture (NA) of the objective lens 54 is preferably within a range of 0.5 to 1.0 µm so as to adjust the spot diameter of the laser beam to within a range of 0.4 to 0.7 µm. The wavelength of the laser beam is preferably 450 nm or less (and more preferably in the blue-violet band of 350 to 450 nm). The linear velocity at which information is recorded and reproduced is preferably within a range of 3 to 20 m/sec, at which reproduction light is less likely to cause crystallization, and at which adequate erasure rate is obtained.

The recording, erasure, and over-write recording of information to and from the information recording medium are accomplished by modulation of the laser beam power between high (peak power) and low (bias power). Irradiation with the laser beam at peak power forms an amorphous phase in local parts of the recording film of the information recording medium, and this amorphous phase becomes recorded components (recording marks). In between the recording marks, the medium is irradiated with the laser beam at bias power, forming a crystal phase, and this crystal phase becomes erased components. During irradiation with the laser beam at peak power, a multipulse formed by a pulse train is generally used. The multipulse may be modulated between peak and bias power levels, or may be modulated between any desired power levels from 0 mW to the peak power.

When a guide groove is provided to the substrate 11, information may be recorded to the groove face closer to the side where the laser beam is incident (groove), or the groove face farther from the side where the laser beam is incident (land), or to both of these.

The reproduction of information is accomplished by irradiating the information recording medium with the laser beam, and reading signals from the information recording medium with a detector. The laser beam power during reproduction should be such that enough light will be reflected to detect recording marks on the information recording medium, but without affecting the optical state of the recording marks.

Embodiment 6

As Embodiment 6, a method for recording and reproducing information will be described for the information recording medium 4 described in Embodiment 4. The structure of part of the recording and reproduction device 50 used in the recording and reproduction method of the present invention is the same as that in Embodiment 5, and is shown in FIG. 5. Portions that are the same as Embodiment 5 will not be described again.

The numerical aperture (NA) of the objective lens 54 is preferably within a range of 0.5 to 1.0 µm so as to adjust the spot diameter of the laser beam to within a range of 0.4 to 0.7 µm. The wavelength of the laser beam is preferably 700 nm or less (and more preferably between 700 and 600 nm). The linear velocity is preferably within a range of 3 to 20 m/sec, at which reproduction light is less likely to cause crystallization, and at which adequate erasure rate is obtained.

Embodiment 7

Figure 6:
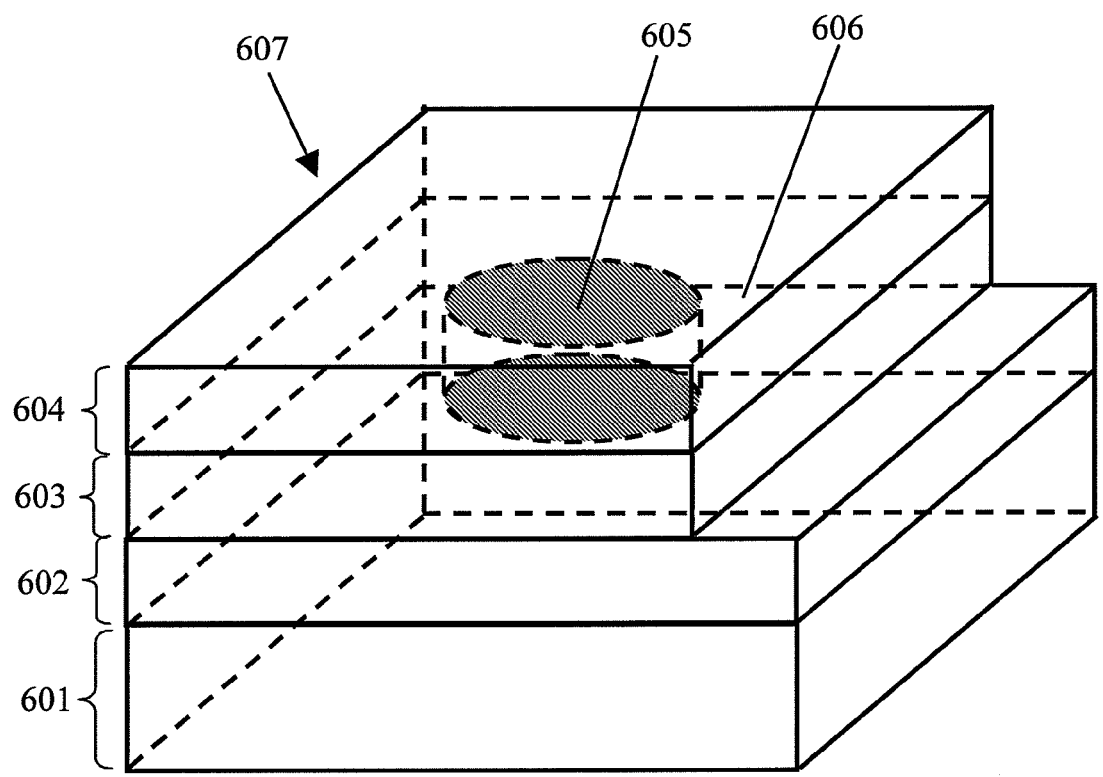
FIG. 6 is a partial cross section of an information recording medium 607 in Embodiment 7 of the present invention.

An example of an information recording medium with which information is recorded or reproduced by the application of electrical energy will be given as Embodiment 7 of the present invention. FIG. 6 is a partial cross section of this information recording medium.

FIG. 6 shows a memory 607 in which a lower electrode 602, a recording component 603, and an upper electrode 604 are formed on the surface of a substrate 601. The recording component 603 of the memory 607 is made up of a cylindrical recording layer 605 and a dielectric layer 606 that surrounds this recording layer 605. The structure of this memory 607 is different from that of the optical information recording media illustrated in FIGS. 1 to 4 in that the recording layer 605 and the dielectric layer 606 are formed on the same surface, rather than one being laminated over the other. However, since these form part of the laminar structure including the substrate 601, the lower electrode 602, and the upper electrode 604, they can each be called a "layer." Therefore, the information recording medium of the present invention includes a configuration in which a recording layer and a dielectric layer are both formed on the same surface.

Specific examples of the substrate 601 include a semiconductor substrate of silicon or the like, a polycarbonate substrate, and an insulating substrate of $SiO_2$, $Al_2O_3$, or the like. Specific examples of the materials of the lower electrode 602 and upper electrode 604 are the materials listed for the reflective layer 12 in Embodiment 1.

The recording layer 605 forming part of the recording component 603 is formed from a material that undergoes a phase change as a result of joule heat produced by the application of electrical energy. More specifically, the material of the recording layer 605 can be the same as the material of the recording layer 15 given in Embodiment 1.

The function of the dielectric layer 606 forming part of the recording component 603 is to prevent current that flows to the recording layer 605 from escaping to the peripheral part when voltage is applied between the lower electrode 602 and the upper electrode 604, and thereby electrically and thermally shield the recording layer 605. The material of the dielectric layer 606 is the oxide-fluoride dielectric of the present invention (such as a dielectric containing indium (In), an element M1, oxygen (O), an element M2, and fluorine (F)).

Methods that can be used to form the lower electrode 602, the upper electrode 604, the recording layer 605, and the dielectric layer 606 include sputtering, vacuum vapor deposition, ion plating, CVD, and MBE.

Embodiment 8

Figure 7:
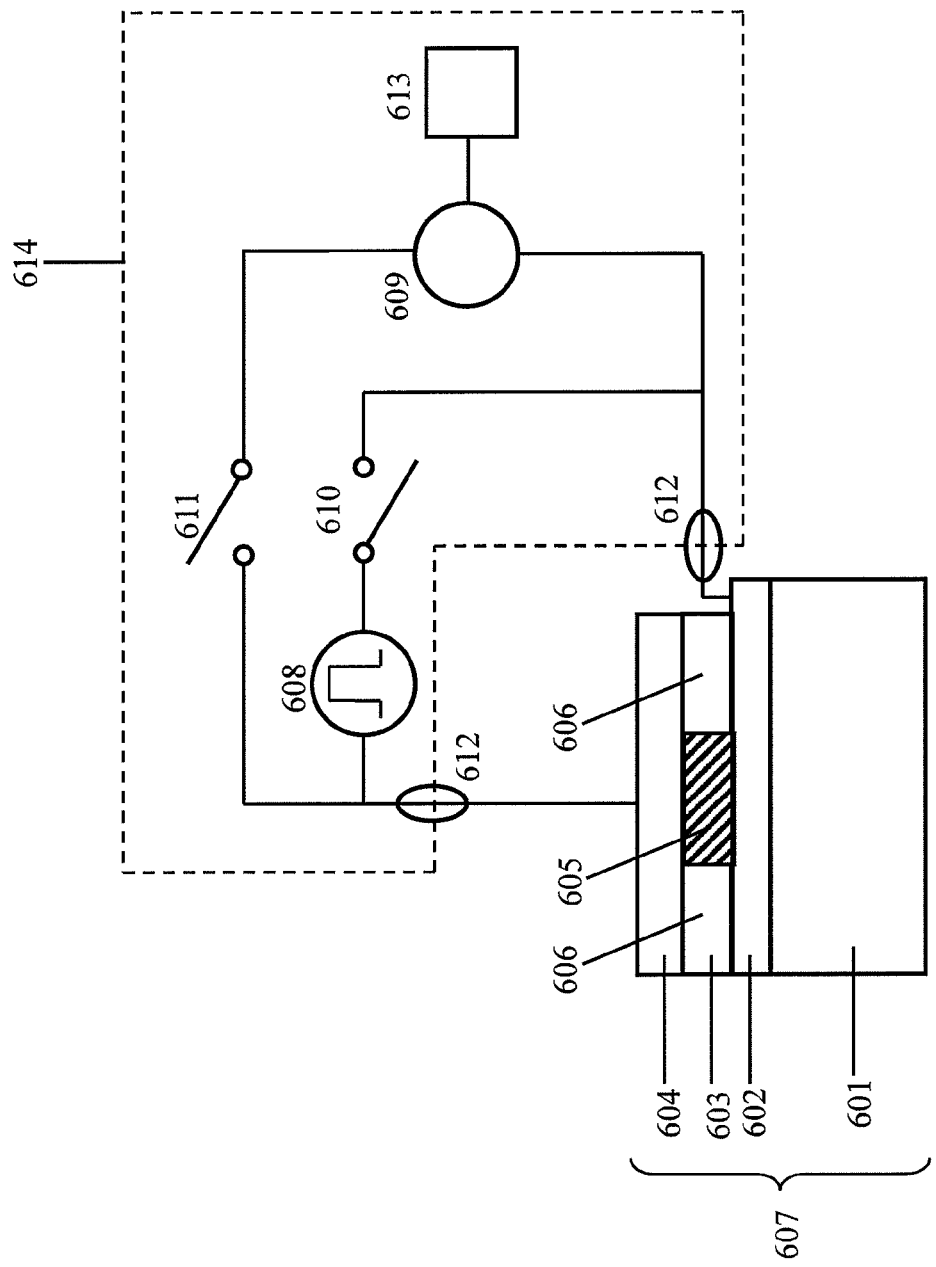
FIG. 7 is a schematic of an example of a system in which the information recording medium shown in FIG. 6 is used.

An example of a system in which the information recording medium (memory) 607 described in Embodiment 7 will be given as Embodiment 8 of the present invention. FIG. 7 is a schematic of this system.

Two application components 612 are bonded by gold or aluminum leads to the lower electrode 602 and the upper electrode 604, respectively, thereby connecting the memory 607 to an electrical read/write device 614 via the application components 612. With this electrical read/write device 614, the application components 612 are connected to the lower electrode 602 and the upper electrode 604, respectively. Between the application components 612 connected are a pulse generator 608 (via a switch 610) and a resistance meter 609 (via a switch 611). A decision unit 613 for deciding whether the resistance measured by the resistance meter 609 is high or low is connected to the resistance meter 609. The pulse generator 608 causes current pulses to flow between the lower electrode 602 and the upper electrode 604 via the application components 612, the resistance between the lower electrode 602 and the upper electrode 604 is measured by the resistance meter 609, and the decision unit 613 decides whether this resistance value is high or low.

In general, resistance varies with a change in the phase of the recording layer 605, so the phase of the recording layer 605 can be ascertained on the basis of this decision result, and this makes it possible to decide whether information has been written to or erased from the memory 607.

Working Examples

The present invention will now be described in further detail through working examples.

Working Example 1

An example of the information recording medium 1 will be described in this working example. The following is a method for manufacturing the information recording medium of Working Example 1.

First, a polycarbonate substrate in which a guide groove had been formed to a depth of 20 nm and at a track pitch of 0.32 μm was readied as a substrate 11. A reflective layer 12 (an Ag—Pd—Cu film; 80 μm), a second dielectric layer 13, a second interface layer 14 (a $ZrO_2$—$SiO_2$—$In_2O_3$ film (and more specifically, expressed by the formula $(ZrO_2)_{25}(SiO_2)_{25}(In_2O_3)_{50}$ (mol %); 5 nm)), a recording layer 15 (a Ge—Bi—Te—Sn film (and more specifically, expressed by the formula $Ge_{44.0}Bi_{3.0}Te_{50.7}Sn_{2.3}$ (atom %); 11 nm)), a first interface layer 16 (a $ZrO_2$—$SiO_2$—$Cr_2O_3$ film (and more specifically, expressed by the formula $(ZrO_2)_{25}(SiO_2)_{25}(Cr_2O_3)_{50}$(mol %); 5 nm)), first dielectric layer 17 (a ZnS—$SiO_2$ film (and more specifically, $(ZnS)_{80}(SiO_2)_{20}$(mol %))) were formed in that order over this substrate by sputtering. After this, the first dielectric layer 17 was coated with a UV-curing resin, a polycarbonate substrate (with a diameter of 120 mm and a thickness of 70 μm) was pressed against it, and spin coating was performed, after which the resin was cured by UV rays, and a cover layer 18 was formed, thereby producing the information recording medium 1. Finally, the entire surface of the recording layer 15 was subjected to an initialization process in which it was crystallized with a laser beam.

The thickness of the second dielectric layer 13 and the first dielectric layer 17 was determined by calculation based on the matrix method. More specifically, it was determined such that when a laser beam of 405 nm was incident, the reflectivity (reflection off the mirror surface part of the substrate) of the information recording medium when the recording layer 15 was in its crystal phase would be from 15 to 25%, and the reflectivity (reflection off the mirror surface part of the substrate) of the information recording medium when the recording layer 15 was in its amorphous phase would be from 1 to 5%.

The information recording medium 1 thus produced and a conventional information recording medium were evaluated for adhesion between the reflective layer 12 and the second dielectric layer 13, and recording sensitivity and repeated re-write performance.

Adhesion was evaluated by allowing the information recording medium to stand for 100 hours in a thermostatic tank at a temperature of 90° C. and a relative humidity of 80%, and then using an optical microscope to check for pitting corrosion and separation. The medium was then allowed to stand for another 100 hours (for a total standing time of 200 hours), then checked with an optical microscope to make a final decision as to whether there was any pitting corrosion or separation.

The recording and reproduction device 50 shown in FIG. 5 was used to evaluate the recording sensitivity and repeated re-write performance. The laser beam wavelength was 405 nm, the numerical aperture (NA) of the objective lens was 0.85, the linear velocity during measurement was 4.9 m/s, the shortest mark length was 0.149 μm, and information was recorded in the grooves.

The recording was performed continuously in the same grooves, using random signals from 0.149 μm (2T) to 0.596 μm (8T). The signals were reproduced at various numbers of re-write iterations, and leading jitter (jitter at the front end of a recording mark), trailing jitter (jitter at the rear end of a recording mark), and the average jitter (of leading jitter and trailing jitter) were measured with a time interval analyzer.

The recording sensitivity was termed the peak power value at which jitter was at its minimum value on a curve of average jitter versus peak power. In this working example, a recording sensitivity of 5.7 mW or less was indicated by "good," greater than 5.7 mW and no more than 6.0 mW by "fair," and greater than 6.0 mW by "poor." The number of re-writes until there was a 3% increase versus the first jitter value was termed the upper limit to repeated re-write performance for the information recording medium. The re-write count upper limit is preferably at least 1000, but in this working example 5000 or higher was considered good.

In the following working examples, adhesion, recording sensitivity, and repeated re-write characteristics were similarly evaluated, and the overall performance of the information recording medium that combines these three categories was evaluated as "excellent," "good," "fair," or "poor."

As examples of the information recording medium 1 of this working example, disks were prepared in which oxide-fluoride dielectrics expressed by the formula $In_aM1_bO_cM2_dF_{100-a-b-c-d}$ (atom %) (where M1 is at least one element selected from among Zr, Hf, Y, Ti, Nb, Ta, Cr, Ga, and Si, and M2 is at least one element selected from among La, Ce, Pr, Nd, Gd, Tb, Dy, Ho, Er, Yb, Mg, Ca, and Sr), in which (M1, M2)=(Zr, La), (Zr, Ce), (Zr, Pr), (Zr, Dy), (Zr, Mg), (Hf, La), (Hf, Ce), (Hf, Gd), (Si, La), (Si, Ce), (Cr, La), (Cr, Ce), (Y, La), (Ti, La), (Ta, La), and (Ga, La), and in which (a, b, c, d)=(20, 10, 50, 5), were used for the second dielectric layer 13. These were termed disk Nos. 1-101 to 1-116.

As other examples, disks were prepared in which oxide-fluoride dielectrics expressed by the formula $In_aM1_bO_cM2_dF_{100-a-b-c-d}$ (atom %), in which (M1, M2)= (ZrSi, La), (ZrSi, Ce), (HfSi, La), (HfSi, Ce), (CrSi, La), (CrSi, Ce), (ZrY, La), and (ZrY, Ce), and in which (a, b, c, d)=(15, 15, 56, 4), were used for the second dielectric layer 13. These were termed disk Nos. 1-117 to 1-124.

As other examples, disks were prepared in which oxide-fluoride dielectrics expressed by the formula $In_aM1_bO_cM2_dF_{100-a-b-c-d}$ (atom %), in which (M1, M2)= (Zr, LaCe), (Hf, LaCe), (Si, LaCe), and (Cr, LaCe), and in which (a, b, c, d)=(17, 9, 25, 33), were used for the second dielectric layer 13. These were termed disk Nos. 1-125 to 1-128.

As other examples, disks were prepared in which oxide-fluoride dielectrics expressed by the formula $In_aM1_bO_cM2_dF_{100-a-b-c-d}$ (atom %), in which (M1, M2)= (ZrSi, LaCe), (HfSi, LaCe), (CrSi, LaCe), and (ZrY, LaCe), and in which (a, b, c, d)=(24, 12, 53, 6), were used for the second dielectric layer 13. These were termed disk Nos. 1-129 to 1-132.

Also, to compare with a conventional second dielectric layer, information recording media (disk Nos. 1-000 to 1-006) were produced using $(ZnS)_{80}(SiO_2)_{20}$, $In_2O_3$, $ZrO_2$, $LaF_3$, $(In_2O_3)_{50}(ZrO_2)_{50}$, $(In_2O_3)_{50}(LaF_3)_{50}$ for the second dielectric layer, and the products were evaluated in the same manner.

The evaluation results are given in Table 1.

TABLE 1

| Disk No. | Second dielectric layer 13 | Adhesion to reflective layer 12 | Recording sensitivity | No. of re-writes | Overall evaluation |
|---|---|---|---|---|---|
| 1-101 | $In_{20}Zr_{10}O_{50}La_5F_{15}$ | No separation or pitting | good | >10,000 | excellent |
| 1-102 | $In_{20}Zr_{10}O_{50}Ce_5F_{15}$ | No separation or pitting | good | >10,000 | excellent |
| 1-103 | $In_{20}Zr_{10}O_{50}Pr_5F_{15}$ | No separation or pitting | good | >10,000 | excellent |
| 1-104 | $In_{20}Zr_{10}O_{50}DY_5F_{15}$ | No separation or pitting | good | 10,000 | good |
| 1-105 | $In_{20}Zr_{10}O_{50}Mg_5F_{15}$ | No separation or pitting | good | 10,000 | good |
| 1-106 | $In_{20}Hf_{10}O_{50}La_5F_{15}$ | No separation or pitting | good | >10,000 | excellent |
| 1-107 | $In_{20}Hf_{10}O_{50}Ce_5F_{15}$ | No separation or pitting | good | >10,000 | excellent |
| 1-108 | $In_{20}Hf_{10}O_{50}Gd_5F_{15}$ | No separation or pitting | good | 10,000 | good |
| 1-109 | $In_{20}Si_{10}O_{50}La_5F_{15}$ | No separation or pitting | good | >10,000 | excellent |
| 1-110 | $In_{20}Si_{10}O_{50}Ce_5F_{15}$ | No separation or pitting | good | >10,000 | excellent |
| 1-111 | $In_{20}Cr_{10}O_{50}La_5F_{15}$ | No separation or pitting | good | >10,000 | excellent |
| 1-112 | $In_{20}Cr_{10}O_{50}Ce_5F_{15}$ | No separation or pitting | good | >10,000 | excellent |
| 1-113 | $In_{20}Y_{10}O_{50}La_5F_{15}$ | No separation or pitting | good | 10,000 | good |
| 1-114 | $In_{20}Ti_{10}O_{50}La_5F_{15}$ | No separation or pitting | good | 10,000 | good |
| 1-115 | $In_{20}Ta_{10}O_{50}La_5F_{15}$ | No separation or pitting | good | 10,000 | good |
| 1-116 | $In_{20}Ga_{10}O_{50}La_5F_{15}$ | No separation or pitting | good | 10,000 | good |
| 1-117 | $In_{15}(ZrSi)_{15}O_{56}La_4F_{10}$ | No separation or pitting | good | >10,000 | excellent |
| 1-118 | $In_{15}(ZrSi)_{15}O_{56}Ce_4F_{10}$ | No separation or pitting | good | >10,000 | excellent |
| 1-119 | $In_{15}(HfSi)_{15}O_{56}La_4F_{10}$ | No separation or pitting | good | >10,000 | excellent |
| 1-120 | $In_{15}(HfSi)_{15}O_{56}Ce_4F_{10}$ | No separation or pitting | good | >10,000 | excellent |
| 1-121 | $In_{15}(CrSi)_{15}O_{56}La_4F_{10}$ | No separation or pitting | good | >10,000 | excellent |
| 1-122 | $In_{15}(CrSi)_{15}O_{56}Ce_4F_{10}$ | No separation or pitting | good | >10,000 | excellent |
| 1-123 | $In_{15}(ZrY)_{15}O_{56}La_4F_{10}$ | No separation or pitting | good | >10,000 | excellent |
| 1-124 | $In_{15}(ZrY)_{15}O_{56}Ce_4F_{10}$ | No separation or pitting | good | >10,000 | excellent |
| 1-125 | $In_{17}Zr_9O_{25}(LaCe)_{33}F_{16}$ | No separation or pitting | good | >10,000 | excellent |
| 1-126 | $In_{17}Hf_9O_{25}(LaCe)_{33}F_{16}$ | No separation or pitting | good | >10,000 | excellent |
| 1-127 | $In_{17}Si_9O_{25}(LaCe)_{33}F_{16}$ | No separation or pitting | good | >10,000 | excellent |
| 1-128 | $In_{17}Cr_9O_{25}(LaCe)_{33}F_{16}$ | No separation or pitting | good | >10,000 | excellent |
| 1-129 | $In_{24}(ZrSi)_{12}O_{53}(LaCe)_6F_5$ | No separation or pitting | good | >10,000 | excellent |
| 1-130 | $In_{24}(HfSi)_{12}O_{53}(LaCe)_6F_5$ | No separation or pitting | good | >10,000 | excellent |

TABLE 1-continued

| Disk No. | Second dielectric layer 13 | Adhesion to reflective layer 12 | Recording sensitivity | No. of re-writes | Overall evaluation |
|---|---|---|---|---|---|
| 1-131 | $In_{24}(CrSi)_{12}O_{53}(LaCe)_6F_5$ | No separation or pitting | good | >10,000 | excellent |
| 1-132 | $In_{24}(ZrY)_{12}O_{53}(LaCe)_6F_5$ | No separation or pitting | good | >10,000 | excellent |
| 1-000 | $(ZnS)_{80}(SiO_2)_{20}$ | Many circular pits | good | >10,000 | poor |
| 1-001 | $In_2O_3$ | No separation or pitting | poor | 5000 | poor |
| 1-002 | $ZrO_2$ | No separation or pitting | poor | >10,000 | poor |
| 1-003 | $LaF_3$ | No separation or pitting | good | 800 | poor |
| 1-004 | $(In_2O_3)_{50}(ZrO_2)_{50}$ | No separation or pitting | poor | 8000 | fair |
| 1-005 | $(In_2O_3)_{50}(LaF_3)_{50}$ | No separation or pitting | fair | 3000 | fair |
| 1-006 | $(ZrO_2)_{50}(LaF_3)_{50}$ | Separation, some pitting | fair | 6000 | fair |

As shown in Table 1, as to adhesion, no separation or pitting corrosion occurred in the reflective layer 12 in any of the information recording media 1 in this working example, and the results were greatly improved over conventional example 1-000. That is, none of the oxide-fluoride dielectrics used as the second dielectric layer in this working example was reactive with silver, and there was no diminishment of the characteristics of the information recording medium.

Also, the recording sensitivity and repeated re-write characteristics of all of the information recording media 1 in this working example were greatly improved over the characteristics of conventional examples 1-001 to 1-006. The recording sensitivity was good in every case, being 6.0 mW or less.

It was also shown that re-writing could be performed on the order of 10,000 times. When an information recording medium is used to store audio, still pictures, or video, it preferably can be re-written 1000 times, and when used as an external memory for a computer, it preferably can be re-written at least 10,000 times. That is, all of the information recording media 1 in this working example exhibited properties that made them applicable as an external memory for a computer as well. Furthermore, when all of the elements in M1 and M2 were checked, it was found that when at least one element selected from among Zr, Hf, Y, Cr, or Si was used as M1, and at least one element selected from among La, Ce, Pr, and Nd was used as M2, the number of repeated re-writes was over 10,000, meaning that these elements were more suitable.

As discussed above, an information recording medium having characteristics superior to those in the past was obtained with the present invention.

Working Example 2

In this working example, disks were prepared in which oxide-fluoride dielectrics expressed by the formula $In_aM1_bO_cM2_dF_{100-a-b-c-d}$ (atom %), in which (M1, M2)= (Zr, Ce), and in which (a, b, c, d)=(2, 12, 40, 5), (3, 12, 40, 5), (14, 12, 40, 5), (24, 12, 40, 5), (38, 12, 40, 5), and (40, 12, 40, 5), were used for the second dielectric layer 13 in the information recording medium 1 of Working Example 1. These were termed disk Nos. 1-201 to 1-206.

The adhesion to the reflective layer 12, the recording sensitivity, and the repeated re-write performance were evaluated in the same manner as in Working Example 1. The evaluation results are given in Table 2.

TABLE 2

| Disk No. | Second dielectric layer 13 | Adhesion to reflective layer 12 | Recording sensitivity | No. of re-writes | Overall evaluation |
|---|---|---|---|---|---|
| 1-201 | $In_2Zr_{12}O_{40}Ce_5F_{41}$ | No separation or pitting | fair | >10,000 | good |
| 1-202 | $In_3Zr_{12}O_{40}Ce_5F_{40}$ | No separation or pitting | good | >10,000 | excellent |
| 1-203 | $In_{14}Zr_{12}O_{40}Ce_5F_{29}$ | No separation or pitting | good | >10,000 | excellent |
| 1-204 | $In_{24}Zr_{12}O_{40}Ce_5F_{19}$ | No separation or pitting | good | >10,000 | excellent |
| 1-205 | $In_{38}Zr_{12}O_{40}Ce_5F_5$ | No separation or pitting | good | >10,000 | excellent |
| 1-206 | $In_{40}Zr_{12}O_{40}Ce_5F_3$ | No separation or pitting | good | 7000 | good |

As a result, there was no separation or pitting corrosion in any of the disks. Also, good repeated re-write performance (more than 5000 re-writes) was obtained with all of the disks. In particular, when $3 \leq a \leq 38$, extremely good repeated re-write performance (more than 10,000 re-writes) was obtained with good recording sensitivity.

Similarly, disks were prepared in which (M1, M2)=(Zr, Ce), and in which (a, b, c, d)=(12, 2, 40, 5), (12, 3, 40, 5), (12, 14, 40, 5), (12, 24, 40, 5), (12, 38, 40, 5), and (12, 40, 40, 5). These were termed disk Nos. 1-207 to 1-212.

The adhesion to the reflective layer 12, the recording sensitivity, and the repeated re-write performance were evaluated in the same manner. The evaluation results are given in Table 3.

TABLE 3

| Disk No. | Second dielectric layer 13 | Adhesion to reflective layer 12 | Recording sensitivity | No. of re-writes | Overall evaluation |
|---|---|---|---|---|---|
| 1-207 | $In_{12}Zr_2O_{40}Ce_5F_{41}$ | No separation or pitting | good | 8000 | good |
| 1-208 | $In_{12}Zr_3O_{40}Ce_5F_{40}$ | No separation or pitting | good | >10,000 | excellent |

TABLE 3-continued

| Disk No. | Second dielectric layer 13 | Adhesion to reflective layer 12 | Recording sensitivity | No. of re-writes | Overall evaluation |
|---|---|---|---|---|---|
| 1-209 | $In_{12}Zr_{14}O_{40}Ce_5F_{29}$ | No separation or pitting | good | >10,000 | excellent |
| 1-210 | $In_{12}Zr_{24}O_{40}Ce_5F_{19}$ | No separation or pitting | good | >10,000 | excellent |
| 1-211 | $In_{12}Zr_{38}O_{40}Ce_5F_5$ | No separation or pitting | good | >10,000 | excellent |
| 1-212 | $In_{12}Zr_{40}O_{40}Ce_5F_3$ | No separation or pitting | fair | >10,000 | good |

As a result, there was no separation or pitting corrosion in any of the disks. Also, good repeated re-write performance (more than 5000 re-writes) was obtained with all of the disks. In particular, when $3 \leq b \leq 38$, extremely good repeated re-write performance (more than 10,000 re-writes) was obtained with good recording sensitivity.

Similarly, disks were prepared in which (M1, M2)=(Zr, Ce), and in which (a, b, c, d)=(12, 12, 5, 5), (12, 12, 10, 5), (12, 12, 20, 5), (12, 12, 40, 5), (12, 12, 60, 5), and (12, 12, 65, 5). These were termed disk Nos. 1-213 to 1-218.

The adhesion to the reflective layer 12, the recording sensitivity, and the repeated re-write performance were evaluated in the same manner. The evaluation results are given in Table 4.

TABLE 4

| Disk No. | Second dielectric layer 13 | Adhesion to reflective layer 12 |
|---|---|---|
| 1-213 | $In_{12}Zr_{12}O_5Ce_5F_{66}$ | Separation, but no pitting (no separation after 100 hours) |
| 1-214 | $In_{12}Zr_{12}O_{10}Ce_5F_{61}$ | No separation or pitting |
| 1-215 | $In_{12}Zr_{12}O_{20}Ce_5F_{51}$ | No separation or pitting |
| 1-216 | $In_{12}Zr_{12}O_{40}Ce_5F_{31}$ | No separation or pitting |
| 1-217 | $In_{12}Zr_{12}O_{60}Ce_5F_{11}$ | No separation or pitting |
| 1-218 | $In_{12}Zr_{12}O_{65}Ce_5F_6$ | Separation, but no pitting (no separation after 100 hours) |

As a result, outside the range of $10 \leq c \leq 60$, in the evaluation of adhesion, there was no separation after 100 hours, but separation did occur after 200 hours. It is therefore preferable to use a range of $10 \leq c \leq 60$.

Similarly, disks were prepared in which (M1, M2)=(Zr, Ce), and in which (a, b, c, d)=(12, 12, 35, 0.5), (12, 12, 35, 1), (12, 12, 35, 15), (12, 12, 35, 25), (12, 12, 35, 35), and (12, 12, 35, 40). These were termed disk Nos. 1-219 to 1-224.

The adhesion to the reflective layer 12, the recording sensitivity, and the repeated re-write performance were evaluated in the same manner. The evaluation results are given in Table 5.

TABLE 5

| Disk No. | Second dielectric layer 13 | Adhesion to reflective layer 12 | Recording sensitivity | No. of re-writes | Overall evaluation |
|---|---|---|---|---|---|
| 1-219 | $In_{12}Zr_{12}Ce_{0.5}F_{40.5}$ | No separation or pitting | fair | >10,000 | good |
| 1-220 | $In_{12}Zr_{12}O_{35}Ce_1F_{40}$ | No separation or pitting | good | >10,000 | excellent |
| 1-221 | $In_{12}Zr_{12}O_{35}Ce_{15}F_{26}$ | No separation or pitting | good | >10,000 | excellent |
| 1-222 | $In_{12}Zr_{12}O_{35}Ce_{25}F_{16}$ | No separation or pitting | good | >10,000 | excellent |
| 1-223 | $In_{12}Zr_{12}O_{35}Ce_{35}F_6$ | No separation or pitting | good | >10,000 | excellent |
| 1-224 | $In_{12}Zr_{12}O_{35}Ce_{40}F_1$ | No separation or pitting | good | 6000 | good |

As a result, there was no separation or pitting corrosion in any of the disks. Also, good repeated re-write performance (more than 5000 re-writes) was obtained with all of the disks. In particular, when $1 \leq d \leq 35$, extremely good repeated re-write performance (more than 10,000 re-writes) was obtained with good recording sensitivity.

Similarly, when all of the elements in M1 and M2 were checked, the same results as above were obtained.

Working Example 3

In this working example, disks were prepared in which oxide-fluoride dielectrics expressed by the formula $(In_2O_3)_j$ $(D1)_k(D2)_{100-j-k}$ (mol %) (where D1 is an oxide of at least one element selected from among Zr, Hf, Y, Ti, Nb, Ta, Cr, Ga, and Si, and D2 is a fluoride of at least one element selected from among La, Ce, Pr, Nd, Gd, Tb, Dy, Ho, Er, Yb, Mg, Ca, and Sr), in which (D1, D2)=($ZrO_2$, $LaF_3$), ($ZrO_2$, $CeF_3$), ($ZrO_2$, $PrF_3$), ($ZrO_2$, $DyF_3$), ($ZrO_2$, $MgF$), ($HfO_2$, $LaF_3$), ($HfO_2$, $CeF_3$), ($HfO_2$, $GdF_3$), ($SiO_2$, $LaF_3$), ($SiO_2$, $CeF_3$), ($Cr_2O_3$, $LaF_3$), ($Cr_2O_3$, $CeF_3$), ($Y_2O_3$, $LaF_3$), ($TiO_2$, $LaF_3$), ($Ta_2O_5$, $LaF_3$), and ($Ga_2O_3$, $LaF_3$), and in which (j, k)=(50, 25), were used for the second dielectric layer 13 in the information recording medium 1 of Working Example 1. These were termed disk Nos. 1-301 to 1-316.

As other examples, disks were prepared in which oxide-fluoride dielectrics expressed by the formula $(In_2O_3)_j(D1)_k$ $(D2)_{100-j-k}$ (mol %), in which (D1, D2)=($ZrSiO_4$, $LaF_3$), ($ZrSiO_4$, $CeF_3$), ($HfO_2$—$SiO_2$, $LaF_3$), ($HfO_2$—$SiO_2$, $CeF_3$), ($Cr_2O_3$—$SiO_2$, $LaF_3$), ($Cr_2O_3$—$SiO_2$, $CeF_3$), ($ZrO_2$—$Y_2O_3$, $LaF_3$), and ($ZrO_2$—$Y_2O_3$, $CeF_3$), and in which (j, k)=(50, 25), were used for the second dielectric layer 13. These were termed disk Nos. 1-317 to 1-324.

As other examples, disks were prepared in which oxide-fluoride dielectrics expressed by the formula $(In_2O_3)_j(D1)_k$ $(D2)_{100-j-k}$ (mol %), in which (D1, D2)=($ZrO_2$, $LaF_3$—$CeF_3$), ($HfO_2$, $LaF_3$—$CeF_3$), ($SiO_2$, $LaF_3$—$CeF_3$), and ($Cr_2O_3$, $LaF_3$—$CeF_3$), and in which (j, k)=(50, 25), were used for the second dielectric layer 13. These were termed disk Nos. 1-325 to 1-328.

As other examples, disks were prepared in which oxide-fluoride dielectrics expressed by the formula $(In_2O_3)_j(D1)_k$ $(D2)_{100-j-k}$ (mol %), in which (D1, D2)=($ZrSiO_4$, $LaF_3$—$CeF_3$), ($HfO_2$—$SiO_2$, $LaF_3$—$CeF_3$), ($Cr_2O_3$—$SiO_2$, $LaF_3$—$CeF_3$), and ($ZrO_2$—$Y_2O_3$, $LaF_3$—$CeF_3$), and in which (j, k)=(50, 25), were used for the second dielectric layer 13. These were termed disk Nos. 1-329 to 1-332.

The evaluation results are given in Table 6.

TABLE 6

| Disk No. | Second dielectric layer 13 | Adhesion to reflective layer 12 | Recording sensitivity | No. of re-writes | Overall evaluation |
|---|---|---|---|---|---|
| 1-301 | $(In_2O_3)_{50}(ZrO_2)_{25}(LaF_3)_{25}$ | No separation or pitting | good | >10,000 | excellent |
| 1-302 | $(In_2O_3)_{50}(ZrO_2)_{25}(CeF_3)_{25}$ | No separation or pitting | good | >10,000 | excellent |
| 1-303 | $(In_2O_3)_{50}(ZrO_2)_{25}(PrF_3)_{25}$ | No separation or pitting | good | >10,000 | excellent |
| 1-304 | $(In_2O_3)_{50}(ZrO_2)_{25}(DyF_3)_{25}$ | No separation or pitting | good | 10,000 | good |
| 1-305 | $(In_2O_3)_{50}(ZrO_2)_{25}(MgF)_{25}$ | No separation or pitting | good | 10,000 | good |
| 1-306 | $(In_2O_3)_{50}(HfO_2)_{25}(LaF_3)_{25}$ | No separation or pitting | good | >10,000 | excellent |
| 1-307 | $(In_2O_3)_{50}(HfO_2)_{25}(CeF_3)_{25}$ | No separation or pitting | good | >10,000 | excellent |
| 1-308 | $(In_2O_3)_{50}(HfO_2)_{25}(GdF_3)_{25}$ | No separation or pitting | good | 10,000 | good |
| 1-309 | $(In_2O_3)_{50}(SiO_2)_{25}(LaF_3)_{25}$ | No separation or pitting | good | >10,000 | excellent |
| 1-310 | $(In_2O_3)_{50}(SiO_2)_{25}(CeF_3)_{25}$ | No separation or pitting | good | >10,000 | excellent |
| 1-311 | $(In_2O_3)_{50}(Cr_2O_3)_{25}(LaF_3)_{25}$ | No separation or pitting | good | >10,000 | excellent |
| 1-312 | $(In_2O_3)_{50}(Cr_2O_3)_{25}(CeF_3)_{25}$ | No separation or pitting | good | >10,000 | excellent |
| 1-313 | $(In_2O_3)_{50}(Y_2O_3)_{25}(LaF_3)_{25}$ | No separation or pitting | good | 10,000 | good |
| 1-314 | $(In_2O_3)_{50}(TiO_2)_{25}(LaF_3)_{25}$ | No separation or pitting | good | 10,000 | good |
| 1-315 | $(In_2O_3)_{50}(Ta_2O_5)_{25}(LaF_3)_{25}$ | No separation or pitting | good | 10,000 | good |
| 1-316 | $(In_2O_3)_{50}(Ga_2O_3)_{25}(LaF_3)_{25}$ | No separation or pitting | good | 10,000 | good |
| 1-317 | $(In_2O_3)_{50}(ZrSiO_4)_{25}(LaF_3)_{25}$ | No separation or pitting | good | >10,000 | excellent |
| 1-318 | $(In_2O_3)_{50}(ZrSiO_4)_{25}(CeF_3)_{25}$ | No separation or pitting | good | >10,000 | excellent |
| 1-319 | $(In_2O_3)_{50}(HfO_2—SiO_2)_{25}(LaF_3)_{25}$ | No separation or pitting | good | >10,000 | excellent |
| 1-320 | $(In_2O_3)_{50}(HfO_2—SiO_2)_{25}(CeF_3)_{25}$ | No separation or pitting | good | >10,000 | excellent |
| 1-321 | $(In_2O_3)_{50}(Cr_2O_3—SiO_2)_{25}(LaF_3)_{25}$ | No separation or pitting | good | >10,000 | excellent |
| 1-322 | $(In_2O_3)_{50}(Cr_2O_3—SiO_2)_{25}(CeF_3)_{25}$ | No separation or pitting | good | >10,000 | excellent |
| 1-323 | $(In_2O_3)_{50}(ZrO_2—Y_2O_3)_{25}(LaF_3)_{25}$ | No separation or pitting | good | >10,000 | excellent |
| 1-324 | $(In_2O_3)_{50}(ZrO_2—Y_2O_3)_{25}(CeF_3)_{25}$ | No separation or pitting | good | >10,000 | excellent |
| 1-325 | $(In_2O_3)_{50}(ZrO_2)_{25}(LaF_3—CeF_3)_{25}$ | No separation or pitting | good | >10,000 | excellent |
| 1-326 | $(In_2O_3)_{50}(HfO_2)_{25}(LaF_3—CeF_3)_{25}$ | No separation or pitting | good | >10,000 | excellent |
| 1-327 | $(In_2O_3)_{50}(SiO_2)_{25}(LaF_3—CeF_3)_{25}$ | No separation or pitting | good | >10,000 | excellent |
| 1-328 | $(In_2O_3)_{50}(Cr_2O_3)_{25}(LaF_3—CeF_3)_{25}$ | No separation or pitting | good | >10,000 | excellent |
| 1-329 | $(In_2O_3)_{50}(ZrSiO_4)_{25}(LaF_3—CeF_3)_{25}$ | No separation or pitting | good | >10,000 | excellent |
| 1-330 | $(In_2O_3)_{50}(HfO_2—SiO_2)_{25}(LaF_3—CeF_3)_{25}$ | No separation or pitting | good | >10,000 | excellent |
| 1-331 | $(In_2O_3)_{50}(Cr_2O_3—SiO_2)_{25}(LaF_3—CeF_3)_{25}$ | No separation or pitting | good | >10,000 | excellent |
| 1-332 | $(In_2O_3)_{50}(ZrO_2—Y_2O_3)_{25}(LaF_3—CeF_3)_{25}$ | No separation or pitting | good | >10,000 | excellent |
| 1-000 | $(ZnS)_{80}(SiO_2)_{20}$ | Many circular pits | good | >10,000 | poor |
| 1-001 | $In_2O_3$ | No separation or pitting | poor | 5000 | poor |
| 1-002 | $ZrO_2$ | No separation or pitting | poor | >10,000 | poor |
| 1-003 | $LaF_3$ | No separation or pitting | good | 800 | poor |
| 1-004 | $(In_2O_3)_{50}(ZrO_2)_{50}$ | No separation or pitting | poor | 8000 | fair |
| 1-005 | $(In_2O_3)_{50}(LaF_3)_{50}$ | No separation or pitting | fair | 3000 | fair |
| 1-006 | $(ZrO_2)_{50}(LaF_3)_{50}$ | Separation, some pitting | fair | 6000 | fair |

As shown in Table 6, as to adhesion, no separation or pitting corrosion occurred in the reflective layer 12 in any of the information recording media 1 in this working example, and the results were greatly improved over conventional example 1-000. That is, none of the oxide-fluoride dielectrics used as the second dielectric layer in this working example was reactive with silver, and there was no diminishment of the characteristics of the information recording medium.

Also, the recording sensitivity and repeated re-write characteristics of all of the information recording media 1 in this working example were greatly improved over the characteristics of conventional examples 1-001 to 1-006. Furthermore, when all of the elements in D1 and D2 were checked, it was found that when an oxide of at least one element selected from among Zr, Hf, Y, Cr, Si is used for D1, and a fluoride of at least one element selected from among La, Ce, Pr, and Nd is used for D2, the number of re-writes is over 10,000, meaning that these elements were more suitable.

Working Example 4

In this working example, disks were prepared in which oxide-fluoride dielectrics expressed by the formula $(In_2O_3)_j(D1)_k(D2)_{100-j-k}$ (mol %), in which (D1, D2)=($ZrO_2$, $CeF_3$), and in which (j, k)=(15, 25), (20, 25), (40, 25), (60, 25), (85, 13), and (90, 8), were used for the second dielectric layer 13 in the information recording medium 1 of Working Example 1. These were termed disk Nos. 1-401 to 1-406.

The adhesion to the reflective layer 12, the recording sensitivity, and the repeated re-write performance were evaluated in the same manner as in Working Example 1. The evaluation results are given in Table 7.

TABLE 7

| Disk No. | Second dielectric layer 13 | Adhesion to reflective layer 12 | Recording sensitivity | No. of re-writes | Overall evaluation |
|---|---|---|---|---|---|
| 1-401 | $(In_2O_3)_{15}(ZrO_2)_{25}(CeF_3)_{60}$ | Separation, but no pitting (no separation after 100 hours) | good | 7000 | good |
| 1-402 | $(In_2O_3)_{20}(ZrO_2)_{25}(CeF_3)_{55}$ | No separation or pitting | good | >10,000 | excellent |

TABLE 7-continued

| Disk No. | Second dielectric layer 13 | Adhesion to reflective layer 12 | Recording sensitivity | No. of re-writes | Overall evaluation |
|---|---|---|---|---|---|
| 1-403 | $(In_2O_3)_{40}(ZrO_2)_{25}(CeF_3)_{35}$ | No separation or pitting | good | >10,000 | excellent |
| 1-404 | $(In_2O_3)_{60}(ZrO_2)_{25}(CeF_3)_{15}$ | No separation or pitting | good | >10,000 | excellent |
| 1-405 | $(In_2O_3)_{85}(ZrO_2)_{13}(CeF_3)_2$ | No separation or pitting | good | >10,000 | excellent |
| 1-406 | $(In_2O_3)_{90}(ZrO_2)_8(CeF_3)_2$ | No separation or pitting | good | 6000 | good |

As a result, when j<20, in the evaluation of adhesion, no separation occurred after 100 hours, but separation did occur after 200 hours. For all the disks, good repeated re-write performance (over 5000 re-writes) was obtained. Also, when j>85, the D1 and D2 contents were so low that repeated re-write performance decreased. Accordingly, particularly good repeated re-write performance (over 10,000 re-writes) was obtained at good recording sensitivity when $20 \leq j \leq 85$.

Similarly, disks were prepared in which (D1, D2)=(ZrO$_2$, CeF$_3$), and in which (j, k)=(25, 15), (25, 20), (25, 40), (25, 60), (13, 85), and (8, 90). These were termed disk Nos. 1-407 to 1-412. The adhesion to the reflective layer 12, the recording sensitivity, and the repeated re-write performance were evaluated in the same manner. The evaluation results are given in Table 8.

TABLE 8

| Disk No. | Second dielectric layer 13 | Adhesion to reflective layer 12 | Recording sensitivity | No. of re-writes | Overall evaluation |
|---|---|---|---|---|---|
| 1-407 | $(In_2O_3)_{25}(ZrO_2)_{15}(CeF_3)_{60}$ | No separation or pitting | good | 4000 | good |
| 1-408 | $(In_2O_3)_{25}(ZrO_2)_{20}(CeF_3)_{55}$ | No separation or pitting | good | >10,000 | excellent |
| 1-409 | $(In_2O_3)_{25}(ZrO_2)_{40}(CeF_3)_{35}$ | No separation or pitting | good | >10,000 | excellent |
| 1-410 | $(In_2O_3)_{25}(ZrO_2)_{60}(CeF_3)_{15}$ | No separation or pitting | good | >10,000 | excellent |
| 1-411 | $(In_2O_3)_{13}(ZrO_2)_{85}(CeF_3)_2$ | No separation or pitting | good | >10,000 | excellent |
| 1-412 | $(In_2O_3)_8(ZrO_2)_{90}(CeF_3)_{90}$ | No separation or pitting | fair | >10,000 | good |

As a result, when k<20, the D1 content was so low that the transparency of the dielectric decreased, and this adversely affected re-write performance (less than 5000 times). Also, when k>85, the D2 content was so low that recording sensitivity suffered. Accordingly, particularly good repeated re-write performance (over 10,000 re-writes) was obtained at good recording sensitivity when $20 \leq k \leq 85$.

Similarly, when all of the elements in D1 and D2 were checked, the same results as above were obtained.

Working Example 5

An information recording medium 2 will be described in this working example. The methods for forming the various layers of the information recording medium 2 were the same as in Working Example 1. In this working example, disks were prepared in which oxide-fluoride dielectrics expressed by the formula $(In_2O_3)_j(D1)_k(D2)_{100-j-k}$ (mol %), in which (D1, D2)=(ZrO$_2$, LaF$_3$), (ZrO$_2$, CeF$_3$), (ZrO$_2$, DyF$_3$), (ZrO$_2$, MgF), (HfO$_2$, LaF$_3$), (HfO$_2$, CeF$_3$), (TiO$_2$, LaF$_3$), (TiO$_2$, CeF$_3$), (SiO$_2$, LaF$_3$), (SiO$_2$, CeF$_3$), (Cr$_2$O$_3$, LaF$_3$), (Cr$_2$O$_3$, CeF$_3$), (Ga$_2$O$_3$, LaF$_3$), and (Nb$_2$O$_5$, CeF$_3$), and in which (j, k)=(50, 25), were used for the second dielectric layer 13. These were termed disk Nos. 2-101 to 2-214, and the adhesion to the recording layer was evaluated.

Also, just as in Working Example 1, a conventional information recording medium (disk No. 2-000) in which $(ZnS)_{80}$ $(SiO_2)_{20}$ was used for the second dielectric layer 13 was produced and compared. The evaluation results are given in Table 9.

TABLE 9

| Disk No. | Second dielectric layer 13 | Adhesion to recording layer 15 |
|---|---|---|
| 2-101 | $(In_2O_3)_{50}(ZrO_2)_{25}(LaF_3)_{25}$ | No separation or pitting |
| 2-102 | $(In_2O_3)_{50}(ZrO_2)_{25}(CeF_3)_{25}$ | No separation or pitting |
| 2-103 | $(In_2O_3)_{50}(ZrO_2)_{25}(DyF_3)_{25}$ | No separation or pitting |
| 2-104 | $(In_2O_3)_{50}(ZrO_2)_{25}(MgF)_{25}$ | No separation or pitting |
| 2-105 | $(In_2O_3)_{50}(HfO_2)_{25}(LaF_3)_{25}$ | No separation or pitting |
| 2-106 | $(In_2O_3)_{50}(HfO_2)_{25}(CeF_3)_{25}$ | No separation or pitting |
| 2-107 | $(In_2O_3)_{50}(TiO_2)_{25}(LaF_3)_{25}$ | No separation or pitting |

TABLE 9-continued

| Disk No. | Second dielectric layer 13 | Adhesion to recording layer 15 |
|---|---|---|
| 2-108 | $(In_2O_3)_{50}(TiO_2)_{25}(CeF_3)_{25}$ | No separation or pitting |
| 2-109 | $(In_2O_3)_{50}(SiO_2)_{25}(LaF_3)_{25}$ | No separation or pitting |
| 2-110 | $(In_2O_3)_{50}(SiO_2)_{25}(CeF_3)_{25}$ | No separation or pitting |
| 2-111 | $(In_2O_3)_{50}(Cr_2O_3)_{25}(LaF_3)_{25}$ | No separation or pitting |
| 2-112 | $(In_2O_3)_{50}(Cr_2O_3)_{25}(CeF_3)_{25}$ | No separation or pitting |
| 2-113 | $(In_2O_3)_{50}(Ga_2O_3)_{25}(LaF_3)_{25}$ | Separation, but no pitting (no separation after 100 hours) |
| 2-114 | $(In_2O_3)_{50}(Nb_2O_5)_{25}(CeF_3)_{25}$ | Separation, but no pitting (no separation after 100 hours) |
| 2-000 | $(ZnS)_{80}(SiO_2)_{20}$ | Many circular pits |

As shown in Table 9, no pitting corrosion occurred in the recording layer 15 with any of the information recording media 2 in this working example. Separation did not occur after 100 hours depending on the selection of D1 and D2, and although separation did occur in some disks after 200 hours, the adhesion was superior to that in the conventional example (disk No. 2-000).

Working Example 6

An information recording medium 3 will be described in this working example. The method for forming the information layer 302 of the information recording medium 3 was the same as in Working Example 1. In this working example, disks were prepared in which oxide-fluoride dielectrics expressed by the formula $(In_2O_3)_j(D1)_k(D2)_{100-j-k}$ (mol %), in which (D1, D2)=$(ZrO_2, LaF_3)$, $(ZrO_2, CeF_3)$, $(HfO_2, LaF_3)$, $(HfO_2, CeF_3)$, $(SiO_2, LaF_3)$, $(SiO_2, CeF_3)$, $(Cr_2O_3, LaF_3)$, and $(Cr_2O_3, CeF_3)$, and in which (j, k)=(50, 25), were used for the second dielectric layer 13. These were termed disk Nos. 3-101 to 3-108.

Then, an optical separation layer 31 provided with a guide groove was formed over the information layer 302.

Then, the information layer 301 was formed over the optical separation layer 31. The information layer 301 was formed by sputtering $TiO_2$ as a transmissivity adjustment layer 32 (21 nm; ≈($^{11}/_{80}$)λ/n), an Ag—Pd—Cu film as a reflective layer 33 (10 nm), a $ZrO_2$—$SiO_2$—$In_2O_3$ film (and more specifically, expressed by the formula $(ZrO_2)_{25}(SiO_2)_{25}(In_2O_3)_{50}$ (mol %)) as a second dielectric layer 34, a Ge—Bi—Te—Sn film (and more specifically, expressed by the formula $Ge_{42.7}Bi_{4.1}Te_{51.0}Sn_{2.2}$ (atom %); 6.5 nm) as a recording layer 35, a $ZrO_2$—$SiO_2$—$Cr_2O_3$ film (and more specifically, expressed by the formula $(ZrO_2)_{25}(SiO_2)_{25}(Cr_2O_3)_{50}$(mol %); 5 nm) as an interface layer 36, and a ZnS—$SiO_2$ film (and more specifically, $(ZnS)_{80}(SiO_2)_{20}$(mol %)) as a first dielectric layer 37, in that order. Finally, the first dielectric layer 37 was coated with a UV-curing resin, a polycarbonate substrate (with a diameter of 120 mm and a thickness of 70 μm) was pressed against it, and spin coating was performed, after which the resin was cured by UV rays to form a cover layer 18, thereby producing the information recording medium 3.

The thickness of the second dielectric layer 34 and the first dielectric layer 37 was determined by calculation based on the matrix method. More specifically, it was determined such that when a laser beam of 405 nm was incident, the reflectivity (reflection off the mirror surface part of the substrate) of the information recording medium when the recording layer 35 was in its crystal phase would be from 4 to 10%, the reflectivity (reflection off the mirror surface part of the substrate) of the information recording medium when the recording layer 35 was in its amorphous phase would be from 1 to 5%, and the transmissivity $T_c$(%) and the transmissivity $T_a$(%) were both 45 to 55%.

The information recording media 3 (disk Nos. 3-101 to 3-108) thus produced were evaluated for adhesion between the reflective layer 33 and the second dielectric layer 34, and recording sensitivity and repeated re-write performance of the information layer 302, in the same manner as in Working Example 1. In this working example, a recording sensitivity of 11.4 mW or less was indicated by "good," greater than 11.4 mW and no more than 12.0 mW by "fair," and greater than 12.0 mW by "poor."

Also, just as in Working Example 1, conventional information recording media (disk Nos. 3-000 to 3-006) in which $(ZnS)_{80}(SiO_2)_{20}$, $In_2O_3$, $ZrO_2$, $LaF_3$, $(In_2O_3)_{50}(ZrO_2)_{50}$, $(In_2O_3)_{50}(LaF_3)_{50}$, and $(ZrO_2)_{50}(LaF_3)_{50}$ were used for the second dielectric layer 13 were produced and compared. The evaluation results are given in Table 10.

TABLE 10

| Disk No. | Second dielectric layer 13 | Adhesion to reflective layer 12 | Recording sensitivity | No. of re-writes | Overall evaluation |
|---|---|---|---|---|---|
| 3-101 | $(In_2O_3)_{50}(ZrO_2)_{25}(LaF_3)_{25}$ | No separation or pitting | good | >10,000 | excellent |
| 3-102 | $(In_2O_3)_{50}(ZrO_2)_{25}(CeF_3)_{25}$ | No separation or pitting | good | >10,000 | excellent |
| 3-103 | $(In_2O_3)_{50}(HfO_2)_{25}(LaF_3)_{25}$ | No separation or pitting | good | >10,000 | excellent |
| 3-104 | $(In_2O_3)_{50}(HfO_2)_{25}(CeF_3)_{25}$ | No separation or pitting | good | >10,000 | excellent |
| 3-105 | $(In_2O_3)_{50}(SiO_2)_{25}(LaF_3)_{25}$ | No separation or pitting | good | >10,000 | excellent |
| 3-106 | $(In_2O_3)_{50}(SiO_2)_{25}(CeF_3)_{25}$ | No separation or pitting | good | >10,000 | excellent |
| 3-107 | $(In_2O_3)_{50}(Cr_2O_3)_{25}(LaF_3)_{25}$ | No separation or pitting | good | >10,000 | excellent |
| 3-108 | $(In_2O_3)_{50}(Cr_2O_3)_{25}(CeF_3)_{25}$ | No separation or pitting | good | >10,000 | good |
| 3-000 | $(ZnS)_{80}(SiO_2)_{20}$ | Many circular pits | good | >10,000 | poor |
| 3-001 | $In_2O_3$ | No separation or pitting | poor | 5000 | poor |
| 3-002 | $ZrO_2$ | No separation or pitting | poor | >10,000 | poor |
| 3-003 | $LaF_3$ | No separation or pitting | good | 800 | poor |
| 3-004 | $(In_2O_3)_{50}(ZrO_2)_{50}$ | No separation or pitting | poor | 8000 | fair |
| 3-005 | $(In_2O_3)_{50}(LaF_3)_{50}$ | No separation or pitting | fair | 3000 | fair |
| 3-006 | $(ZrO_2)_{50}(LaF_3)_{50}$ | Separation, some pitting | fair | 6000 | fair |

As shown in Table 10, as to adhesion, no separation or pitting corrosion occurred in the reflective layer 33 in any of the information recording media 3 in this working example, and the results were greatly improved over conventional example 3-000. Also, the recording sensitivity and repeated re-write characteristics of all of the information recording media 3 in this working example were greatly improved over the characteristics of conventional examples 3-001 to 3-006.

The recording sensitivity was good (12.0 mW or less) in every case.

Also, it was seen that all of the disks could be re-written more than 10,000 times, and all of the information recording media 3 in this working example exhibited properties that made them applicable as an external memory for a computer.

As discussed above, information recording media having better characteristics than in the past were obtained with the present invention.

Working Example 7

In this working example, disks were prepared in which oxide-fluoride dielectrics expressed by the formula $(In_2O_3)_j(D1)_k(D2)_{100-j-k}$ (mol %), in which (D1, D2)=$(ZrO_2, CeF_3)$, and in which (j, k)=(50, 25), were used for the second dielectric layer 13 in the above-mentioned information recording medium 3 of Working Example 6, and oxide-fluoride dielectrics expressed by the formula $(In_2O_3)_j(D1)_k(D2)_{100-j-k}$ (mol %), in which (D1, D2)=$(ZrO_2, LaF_3)$, $(ZrO_2, CeF_3)$, $(ZrO_2, DyF_3)$, $(ZrO_2, MgF)$, $(HfO_2, LaF_3)$, $(HrO_2, CeF_3)$, $(TiO_2, LaF_3)$, $(TiO_2, CeF_3)$, $(SiO_2, LaF_3)$, $(SiO_2, CeF_3)$, $(Cr_2O_3, LaF_3)$, $(Cr_2O_3, CeF_3)$, $(Ga_2O_3, LaF_3)$, and $(Nb_2O_5, CeF_3)$, and in which (j, k)=(50, 25), were used for the second dielectric layer 34 in the information layer 301. These were termed disk Nos. 3-201 to 3-214, and adhesion to the recording layer was evaluated.

Also, just as in Working Example 1, a conventional information recording medium (disk No. 3-007) in which $(ZnS)_{80}$ $(SiO_2)_{20}$ was used for the second dielectric layer 34 was produced and compared. The evaluation results are given in Table 11.

TABLE 11

| Disk No. | Second dielectric layer 34 | Adhesion to recording layer 35 |
|---|---|---|
| 3-201 | $(In_2O_3)_{50}(ZrO_2)_{25}(LaF_3)_{25}$ | No separation or pitting |
| 3-202 | $(In_2O_3)_{50}(ZrO_2)_{25}(CeF_3)_{25}$ | No separation or pitting |
| 3-203 | $(In_2O_3)_{50}(ZrO_2)_{25}(DyF_3)_{25}$ | Separation, but no pitting (no separation after 100 hours) |
| 3-204 | $(In_2O_3)_{50}(ZrO_2)_{25}(MgF)_{25}$ | Separation, but no pitting (no separation after 100 hours) |
| 3-205 | $(In_2O_3)_{50}(HfO_2)_{25}(LaF_3)_{25}$ | No separation or pitting |
| 3-206 | $(In_2O_3)_{50}(HfO_2)_{25}(CeF_3)_{25}$ | No separation or pitting |
| 3-207 | $(In_2O_3)_{50}(TiO_2)_{25}(LaF_3)_{25}$ | No separation or pitting |
| 3-208 | $(In_2O_3)_{50}(TiO_2)_{25}(CeF_3)_{25}$ | No separation or pitting |
| 3-209 | $(In_2O_3)_{50}(SiO_2)_{25}(LaF_3)_{25}$ | No separation or pitting |
| 2-210 | $(In_2O_3)_{50}(SiO_2)_{25}(CeF_3)_{25}$ | No separation or pitting |
| 3-211 | $(In_2O_3)_{50}(Cr_2O_3)_{25}(LaF_3)_{25}$ | No separation or pitting |
| 3-212 | $(In_2O_3)_{50}(Cr_2O_3)_{25}(CeF_3)_{25}$ | No separation or pitting |
| 3-213 | $(In_2O_3)_{50}(Ga_2O_3)_{25}(LaF_3)_{25}$ | Separation, but no pitting (no separation after 100 hours) |
| 3-214 | $(In_2O_3)_{50}(Nb_2O_5)_{25}(CeF_3)_{25}$ | Separation, but no pitting (no separation after 100 hours) |
| 3-007 | $(ZnS)_{80}(SiO_2)_{20}$ | Many circular pits |

As shown in Table 11, no pitting corrosion occurred in the recording layer 35 with any of the information recording media 3 in this working example. Separation did not occur after 100 hours depending on the selection of D1 and D2, and although separation did occur in some disks after 200 hours, the adhesion was superior to that in the conventional example (disk No. 3-007).

Working Example 8

An information recording medium 4 will be described in this working example.

The information recording medium of Working Example 8 was manufactured by the following method.

First, a polycarbonate substrate in which a guide groove had been formed to a depth of 40 nm and at a track pitch of 0.62 μm was readied as a substrate 43. A first dielectric layer 17 (a ZnS—$SiO_2$ film (and more specifically, $(ZnS)_{80}(SiO_2)_{20}$ (mol %))), a first interface layer 16 (a $ZrO_2$—$SiO_2$—$Cr_2O_3$ film (and more specifically, expressed by the formula $(ZrO_2)_{25}(SiO_2)_{25}(Cr_2O_3)_{50}$ (mol %); 5 nm)), a recording layer 15 (a Ge—Bi—Te—Sn film (and more specifically, expressed by the formula $Ge_{44.0}Bi_{3.0}Te_{50.7}Sn_{2.3}$(atom %); 10 nm)), a second interface layer 14 (a $ZrO_2$—$SiO_2$—$Cr_2O_3$ film (and more specifically, expressed by the formula $(ZrO_2)_{25}(SiO_2)_{25}(Cr_2O_3)_{50}$ (mol %); 5 nm)), a second dielectric layer 13, and a reflective layer 12 (an Ag—Pd—Cu film; 100 nm) were formed in that order over this substrate by sputtering. After this, a dummy substrate 41 was coated with a UV-curing resin, the reflective layer 12 of the substrate 43 was pressed against the dummy substrate 41, and this assembly was rotated to form a uniform resin layer (20 μm thick), after which the resin was cured by UV rays, thereby bonding the dummy substrate 41 and the substrate 43 via an adhesive layer 42. Finally, the entire surface of the recording layer 15 was subjected to an initialization process in which it was crystallized with a laser beam.

The thickness of the second dielectric layer 13 and the first dielectric layer 17 was determined by calculation based on the matrix method. More specifically, it was determined such that when a laser beam of 660 nm was incident, the reflectivity (reflection off the mirror surface part of the substrate) of the information recording medium when the recording layer 15 was in its crystal phase would be from 13 to 20%, and the reflectivity (reflection off the mirror surface part of the substrate) of the information recording medium when the recording layer 15 was in its amorphous phase would be from 0.5 to 4%.

The information recording medium 4 thus produced and a conventional information recording medium were evaluated for adhesion between the reflective layer 12 and the second dielectric layer 13, and recording sensitivity and repeated re-write performance.

Just as in Working Example 1, adhesion was evaluated by allowing the information recording medium to stand for 100 hours in a thermostatic tank at a temperature of 90° C. and a relative humidity of 80%, and then using an optical microscope to check for pitting corrosion and separation. The medium was then allowed to stand for another 100 hours (for a total standing time of 200 hours), then checked with an optical microscope to make a final decision as to whether there was any pitting corrosion or separation.

The recording and reproduction device 50 shown in FIG. 5 was used to evaluate the recording sensitivity and repeated re-write performance. The laser beam wavelength was 660 nm, the numerical aperture (NA) of the objective lens was 0.65, the linear velocity during measurement was 8.2 m/s, the shortest mark length was 0.42 μm, and information was recorded in the grooves and lands.

The recording was performed continuously in the same grooves and lands, using random signals from 0.42 μm (3T) to 1.54 μm (11T). The signals were reproduced at various numbers of re-write iterations, and leading jitter (jitter at the front end of a recording mark), trailing jitter (jitter at the rear end of a recording mark), and the average jitter (of leading jitter and trailing jitter) were measured with a time interval analyzer.

The recording sensitivity was termed the peak power value at which jitter was at its minimum value on a curve of average jitter versus peak power. In this working example, a recording sensitivity of 12.0 mW or less was indicated by "good," greater than 12.0 mW and no more than 14.0 mW by "fair," and greater than 14.0 mW by "poor." The number of re-writes until there was a 3% increase versus the first jitter value was termed the upper limit to repeated re-write performance for the information recording medium. The re-write count upper limit is preferably at least 1000, but in this working example 5000 or higher was considered good.

As examples of the information recording medium 4 of this working example, disks were prepared in which oxide-fluoride dielectrics expressed by the formula $(In_2O_3)_j(D1)_k(D2)_{100-j-k}$ (mol %), in which (D1, D2)=($ZrO_2$, $LaF_3$), ($ZrO_2$, $CeF_3$), ($HfO_2$, $LaF_3$), ($HfO_2$, $CeF_3$), ($SiO_2$, $LaF_3$), ($SiO_2$, $CeF_3$), ($Cr_2O_3$, $LaF_3$), and in which (j, k)=(50, 25), were used for the second dielectric layer 13. These information recording media were termed disk Nos. 4-101 to 4-108.

Also, to compare with a conventional second dielectric layer, information recording media (disk Nos. 4-000 to 4-006) were produced using $(ZnS)_{80}(SiO_2)_{20}$, $In_2O_3$, $ZrO_2$, $LaF_3$, $(In_2O_3)_{50}(ZrO_2)_{50}$, $(In_2O_3)_{50}(LaF_3)_{50}$, and $(ZrO_2)_{50}(LaF_3)_{50}$ for the second dielectric layer, and the products were evaluated in the same manner.

The evaluation results are given in Table 12.

TABLE 12

| Disk No. | Second dielectric layer 13 | Adhesion to reflective layer | Recording sensitivity | No. of re-writes | Overall evaluation |
|---|---|---|---|---|---|
| 4-101 | $(In_2O_3)_{50}(ZrO_2)_{25}(LaF_3)_{25}$ | No separation or pitting | good | >10,000 | excellent |
| 4-102 | $(In_2O_3)_{50}(ZrO_2)_{25}(CeF_3)_{25}$ | No separation or pitting | good | >10,000 | excellent |
| 4-103 | $(In_2O_3)_{50}(HfO_2)_{25}(LaF_3)_{25}$ | No separation or pitting | good | >10,000 | excellent |
| 4-104 | $(In_2O_3)_{50}(HfO_2)_{25}(CeF_3)_{25}$ | No separation or pitting | good | >10,000 | excellent |
| 4-105 | $(In_2O_3)_{50}(SiO_2)_{25}(LaF_3)_{25}$ | No separation or pitting | good | >10,000 | excellent |
| 4-106 | $(In_2O_3)_{50}(SiO_2)_{25}(CeF_3)_{25}$ | No separation or pitting | good | >10,000 | excellent |
| 4-107 | $(In_2O_3)_{50}(Cr_2O_3)_{25}(LaF_3)_{25}$ | No separation or pitting | good | >10,000 | excellent |
| 4-108 | $(In_2O_3)_{50}(Cr_2O_3)_{25}(CeF_3)_{25}$ | No separation or pitting | good | >10,000 | excellent |
| 4-000 | $(ZnS)_{80}(SiO_2)_{20}$ | Many circular pits | good | >10,000 | poor |
| 4-001 | $In_2O_3$ | No separation or pitting | poor | 4000 | poor |
| 4-002 | $ZrO_2$ | No separation or pitting | poor | >10,000 | poor |
| 4-003 | $LaF_3$ | No separation or pitting | good | 750 | poor |
| 4-004 | $(In_2O_3)_{50}(ZrO_2)_{50}$ | No separation or pitting | poor | 7000 | fair |
| 4-005 | $(In_2O_3)_{50}(LaF_3)_{50}$ | No separation or pitting | fair | 2000 | fair |
| 4-006 | $(ZrO_2)_{50}(LaF_3)_{50}$ | Separation, some pitting | fair | 5000 | fair |

As shown in Table 12, as to adhesion, no separation or pitting corrosion occurred in the reflective layer 12 in any of the information recording media 4 in this working example, and the results were greatly improved over conventional example 4-000. That is, none of the oxide-fluoride dielectrics used as the second dielectric layer in this working example was reactive with silver, and there was no diminishment of the characteristics of the information recording medium. Also, the recording sensitivity and repeated re-write characteristics of all of the information recording media 4 in this working example were greatly improved over the characteristics of conventional examples 4-001 to 4-006.

The recording sensitivity was good (12.0 mW or less) in every case.

Also, it was seen that the disks could be re-written more than 10,000 times. When an information recording medium is used to store audio, still pictures, or video, it preferably can be re-written 1000 times, and when used as an external memory for a computer, it preferably can be re-written at least 10,000 times. That is, all of the information recording media 4 in this working example exhibited properties that made them applicable as an external memory for a computer.

As discussed above, an information recording medium having characteristics superior to those in the past was obtained with the present invention.

Working Example 9

An example of an information recording medium (memory) 607 will be described in this working example.

A method for manufacturing an information record medium in the working example 8 will be described below.

First, a lower electrode 602 of gold (thickness of 0.1 µm; over an area of 1.0×1.0 mm), a recording layer 605 of $Ge_{38}Sb_{10}Te_{52}$ (thickness of 0.1 µm; over a circular area 0.2 mm in diameter), a dielectric layer 606 of $(In_2O_3)_{50}(ZrO_2)_{25}$ $(LaF_3)_{25}$ (the oxide-fluoride dielectric of the present invention; thickness of 0.1 µm; over an area of 0.6×0.6 mm (excluding the recording layer 605 portion)), and an upper electrode 604 of gold (thickness of 0.1 µm; over an area of 0.6×0.6 mm) were formed by sputtering in that order over a silicon substrate 601 that was 5 mm long, 5 mm wide, and 1 mm thick and whose surface had undergone a nitriding treatment.

In this working example, the melting point of the recording layer 605 was 650° C., the crystallization temperature was 180° C., and the crystallization time was 140 ns. The resistance between the lower electrode 602 and the upper electrode 604 was 1000Ω when the recording layer 605 was in its amorphous phase, and 30Ω in the crystal phase. When a current pulse of 20 mA and 150 ns was applied between the lower electrode 602 and the upper electrode 604 while the recording layer 605 was in its amorphous phase, the resistance between the electrodes decreased, and the phase of the recording layer 605 changed from amorphous to crystal. When a current pulse of 200 mA and 100 ns was applied between the lower electrode 602 and the upper electrode 604 while the recording layer 605 was in its crystal phase, the resistance between the electrodes increased, and the phase of the recording layer 605 changed from crystal to amorphous.

The above results indicate that when the oxide-fluoride dielectric of the present invention $((In_2O_3)_{50}(ZrO_2)_{25}(LaF_3)_{25})$ is used for the dielectric layer 606, the phase of the recording layer 605 can be changed by the application of electrical energy, and thus the information recording medium 607 has the function of recording information. Also, providing the dielectric layer 606 reduces the leakage of current from the recording layer 605 to the surrounding areas, and allows the temperature of the recording layer 605 to be more efficiently raised by the joule heat produced by the current. Particularly when the recording layer 605 changes from a crystal phase to an amorphous phase, the recording layer 605 must go through the process of first melting and then being quenched, but providing the dielectric layer 606 makes it possible for the temperature of the recording layer 605 to be raised to the melting point by a smaller current.

Also, if the recording component 603 is constituted such that a plurality of recording layers 605 are isolated from one another by the dielectric layer 606, then a plurality of recording layers 605 can be provided, allowing the memory capacity of the information recording medium 607 to be increased, or the access speed or switching function to be enhanced. Furthermore, a plurality of the information recording media 607 themselves can be linked together.

Working Example 10

Figure 8:
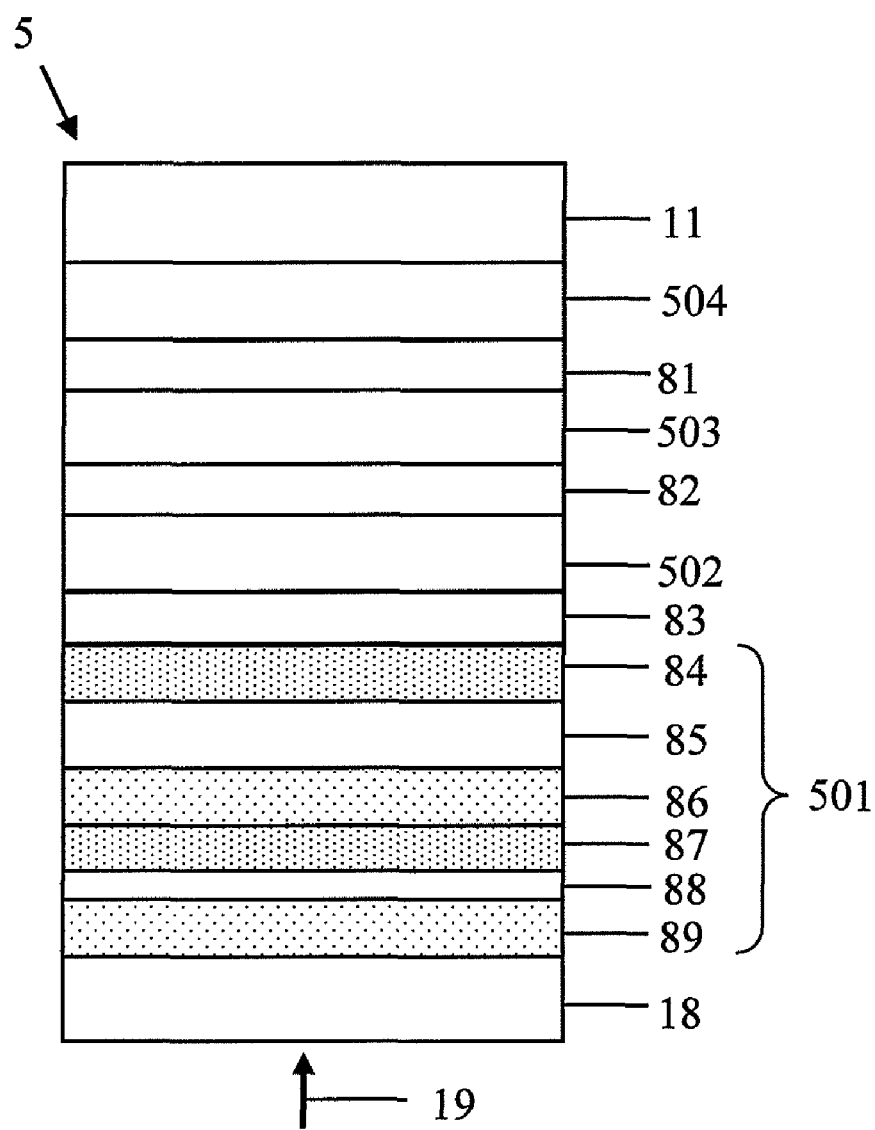
FIG. 8 is a partial cross section of an information recording medium having four information layers.

In this working example, the information recording medium had four information layers as discussed in Embodiment 3(hereinafter referred to as information recording medium 5), and disks were prepared in which oxide-fluoride dielectrics expressed by the formula $(In_2O_3)_j(D1)_k(D2)_{100-j-k}$ (mol %), in which (D1, D2)=$(ZrO_2, LaF_3)$, $(ZrO_2, CeF_3)$, $(ZrO_2, DyF_3)$, $(ZrO_2, MgF)$, $(HfO_2, LaF_3)$, $(HfO_2, CeF_3)$, $(TiO_2, LaF_3)$, $(TiO_2, CeF_3)$, $(SiO_2, LaF_3)$, $(SiO_2, CeF_3)$, ($Cr_2O_3$, $LaF_3$), ($Cr_2O_3$, $CeF_3$), ($Ga_2O_3$, $LaF_3$), and ($Nb_2O_5$, $CeF_3$), and in which (j, k)=(50, 25), were used for a second dielectric layer 86 of an information layer 501 on the side of greatest laser incidence shown in FIG. 8. These were termed disk Nos. 5-101 to 5-114, and adhesion to the recording layer was evaluated.

Also, just as in Working Example 1, a conventional information recording medium (disk No. 5-001) in which $(ZnS)_{80}(SiO_2)_{20}$ was used for the second dielectric layer 34 was produced and compared. The evaluation results are given in Table 13.

TABLE 13

| Disk No. | Second dielectric layer 86 | Adhesion to recording layer 87 |
|---|---|---|
| 5-101 | $(In_2O_3)_{50}(ZrO_2)_{25}(LaF_3)_{25}$ | No separation or pitting |
| 5-102 | $(In_2O_3)_{50}(ZrO_2)_{25}(CeF_3)_{25}$ | No separation or pitting |
| 5-103 | $(In_2O_3)_{50}(ZrO_2)_{25}(DyF_3)_{25}$ | Separation, but no pitting (no separation after 100 hours) |
| 5-104 | $(In_2O_3)_{50}(ZrO_2)_{25}(MgF)_{25}$ | Separation, but no pitting (no separation after 100 hours) |
| 5-105 | $(In_2O_3)_{50}(HfO_2)_{25}(LaF_3)_{25}$ | No separation or pitting |
| 5-106 | $(In_2O_3)_{50}(HfO_2)_{25}(CeF_3)_{25}$ | No separation or pitting |
| 5-107 | $(In_2O_3)_{50}(TiO_2)_{25}(LaF_3)_{25}$ | No separation or pitting |
| 5-108 | $(In_2O_3)_{50}(TiO_2)_{25}(CeF_3)_{25}$ | No separation or pitting |
| 5-109 | $(In_2O_3)_{50}(SiO_2)_{25}(LaF_3)_{25}$ | No separation or pitting |
| 5-110 | $(In_2O_3)_{50}(SiO_2)_{25}(CeF_3)_{25}$ | No separation or pitting |
| 5-111 | $(In_2O_3)_{50}(Cr_2O_3)_{25}(LaF_3)_{25}$ | No separation or pitting |
| 5-112 | $(In_2O_3)_{50}(Cr_2O_3)_{25}(CeF_3)_{25}$ | No separation or pitting |
| 5-113 | $(In_2O_3)_{50}(Ga_2O_3)_{25}(LaF_3)_{25}$ | Separation, but no pitting (no separation after 100 hours) |
| 5-114 | $(In_2O_3)_{50}(Nb_2O_5)_{25}(CeF_3)_{25}$ | Separation, but no pitting (no separation after 100 hours) |
| 5-001 | $(ZnS)_{80}(SiO_2)_{20}$ | Many circular pits |

As shown in Table 13, no pitting corrosion occurred in the recording layer 87 with any of the information recording media 5 in this working example. Separation did not occur after 100 hours depending on the selection of D1 and D2, and although separation did occur in some disks after 200 hours, the adhesion was superior to that in the conventional example (disk No. 5-001).

Examples were given above for embodiments of the present invention, but as mentioned above, the present invention is not limited to or by the above embodiments, and can also be applied to other embodiments on the basis of the technological concept of the present invention.

INDUSTRIAL APPLICABILITY

The information recording medium of the present invention, and the method for manufacturing this medium, is useful as a large-capacity optical information recording medium, such as a Blu-ray Disc or a DVD-RAM or other DVD (Digital Versatile Disk). It can also be applied to small disks, such as those with a diameter of 6 cm or 8 cm. It is also useful as an electrical switching element. In any case, it can be applied regardless of whether the medium is a re-writable type, write-once type, or read only type.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

The invention claimed is:

1. An information recording medium that is equipped with at least a recording layer and undergoes phase change when the recording layer is irradiated with a laser beam or when current is applied, said information recording medium comprising:
   an oxide-fluoride dielectric layer that includes indium (In), an element M1 (where M1 is at least one element selected from among Zr, Hf, Y, Ti, Nb, Ta, Cr, Ga, and Si), oxygen (O), an element M2 (where M2 is at least one element selected from among La, Ce, Pr, Nd, Gd, Tb, Dy, Ho, Er, Yb, Mg, Ca, and Sr), and fluorine (F).

2. The information recording medium according to claim 1, comprising at least two information layers, wherein
   at least one of these information layers has at least the recording layer and the oxide-fluoride dielectric layer.

3. The information recording medium according to claim 1, wherein the oxide-fluoride dielectric layer is expressed by the formula $In_aM1_bO_cM2_dF_{100-a-b-c-d}$ (atom %), where $3 \leq a \leq 38$, $3 \leq b \leq 38$, $10 \leq c \leq 60$, $1 \leq d \leq 35$, and $a+b+c+d<100$.

4. The information recording medium according to claim 1, wherein the oxide-fluoride dielectric layer includes an element M3 selected from a group of the elements M1 (where M3 is at least one element selected from among Zr, Hf, Y, Cr, and Si), and an element M4 selected from a group of the elements M2 (where M4 is at least one element selected from among La, Ce, Pr, and Nd).

5. The information recording medium according to claim 4, wherein the oxide-fluoride dielectric layer is expressed by the formula $In_eM3_fO_gM4_hF_{100-e-f-g-h}$ (atom %), where $3 \leq e \leq 38$, $3 \leq f \leq 38$, $10 \leq g \leq 60$, $1 \leq h \leq 35$, and $e+f+g+h<100$.

6. The information recording medium according to claim 1, wherein the oxide-fluoride dielectric layer includes an oxide of indium (In), an oxide D1 (where D1 is an oxide of at least one element selected from among Zr, Hf, Y, Ti, Nb, Ta, Cr, Ga, and Si), and a fluoride D2 (where D2 is a fluoride of at least one element selected from among La, Ce, Pr, Nd, Gd, Tb, Dy, Ho, Er, Yb, Mg, Ca, and Sr).

7. The information recording medium according to claim 6, wherein the oxide-fluoride dielectric layer is expressed by the formula $(In_2O_3)_j(D1)_k(D2)_{100-j-k}$ (mol %), where $20 \leq j \leq 85$, $20 \leq k \leq 85$, and $j+k<100$.

8. The information recording medium according to claim 1, wherein the oxide-fluoride dielectric layer includes an oxide D3 selected from a group of the oxides D1 (where D3 is an oxide of at least one element selected from among Zr, Hf, Y, Cr, and Si), and a fluoride D4 selected from a group of the fluoride D2 (where D4 is an fluoride of at least one element selected from among La, Ce, Pr, and Nd).

9. The information recording medium according to claim 8, wherein the oxide-fluoride dielectric layer is expressed by the formula $(In_2O_3)_m(D3)_n(D4)_{100-m-n}$ (mol %), where $20 \leq m \leq 85$, $20 \leq n \leq 85$, and $m+n<100$.

10. The information recording medium according to claim 8, wherein the oxide-fluoride dielectric layer is expressed by the formula $(In_2O_3)_m(D3)_n(D4)_{100-m-n}$ (mol %), where $25 \leq m \leq 65$, $20 \leq n \leq 60$, and $m+n<100$.

11. The information recording medium according to claim 1, comprising a reflective layer, a second dielectric layer, the recording layer, and a first dielectric layer, in that order,
    at least one of the first and second dielectric layers is the oxide-fluoride dielectric layer.

12. The information recording medium according to claim 1, comprising a reflective layer, a second dielectric layer, the recording layer, and a first dielectric layer, in that order,
    the second dielectric layer is the oxide-fluoride dielectric layer.

13. The information recording medium according to claim 2, wherein the information layer closest to the side where the laser beam is incident has an optical separation layer, a reflective layer, a fourth dielectric layer, a recording layer, and a third dielectric layer, in that order, and
at least one of the third and fourth dielectric layers is the oxide-fluoride dielectric layer.

14. The information recording medium according to claim 2, the information layer closest to the side where the laser beam is incident has an optical separation layer, a reflective layer, a fourth dielectric layer, a recording layer, and a third dielectric layer, in that order, and
the fourth dielectric layer is the oxide-fluoride dielectric layer.

15. A method for manufacturing the information recording medium according to claim 1, wherein the oxide-fluoride dielectric layer is formed by sputtering, using a sputtering target that includes indium (In), an element M1, oxygen (O), an element M2, and fluorine (F).

16. The method for manufacturing an information recording medium according to claim 15, wherein the sputtering target is expressed by the formula $In_a M1_b O_c M2_d F_{100-a-b-c-d}$ (atom %), and satisfies $3 \leq a \leq 38$, $3 \leq b \leq 38$, $10 \leq c \leq 60$, $1 \leq d \leq 35$, and $a+b+c+d<100$.

17. The method for manufacturing an information recording medium according to claim 15, wherein the sputtering target includes an element M3 selected from a group of the elements M1 (where M3 is at least one element selected from among Zr, Hf, Y, Cr, and Si), and an element M4 selected from a group of the elements M2 (where M4 is at least one element selected from among La, Ce, Pr, and Nd), and
the sputtering target is expressed by the formula $In_e M3_f O_g M4_h F_{100-e-f-g-h}$ (atom %), and satisfies $3 \leq e \leq 38$, $3 \leq f \leq 38$, $10 \leq g \leq 60$, $1 \leq h \leq 35$, and $e+f+g+h<100$.

18. The method for manufacturing an information recording medium according to claim 15, wherein the sputtering target includes an oxide of indium (In), an oxide D1 (where D1 is an oxide of at least one element selected from among Zr, Hf, Y, Ti, Nb, Ta, Cr, Ga, and Si), and a fluoride D2 (where D2 is a fluoride of at least one element selected from among La, Ce, Pr, Nd, Gd, Tb, Dy, Ho, Er, Yb, Mg, Ca, and Sr), and
the sputtering target is expressed by the formula $(In_2O_3)_j (D1)_k (D2)_{100-j-k}$ (mol %), and satisfies $20 \leq j \leq 85$, $20 \leq k \leq 85$, and $j+k<100$.

19. The method for manufacturing an information recording medium according to claim 15, the sputtering target includes an oxide D3 selected from the oxide D1 (where D3 is an oxide of at least one element selected from among Zr, Hf, Y, Cr, and Si), and a fluoride D4 selected from the fluoride D2 (where D4 is a fluoride of at least one element selected from among La, Ce, Pr, and Nd), and
the sputtering target is expressed by the formula $(In_2O_3)_m (D3)_n (D4)_{100-m-n}$ (mol %), and satisfies $20 \leq m \leq 85$, $20 \leq n \leq 85$, and $m+n<100$.

* * * * *